United States Patent
Kuwahara et al.

(10) Patent No.: US 7,440,370 B2
(45) Date of Patent: Oct. 21, 2008

(54) METHOD FOR DETERMINING A REPRODUCING POWER OF A LASER BEAM AND AN APPARATUS FOR RECORDING AND REPRODUCING DATA

(75) Inventors: Masashi Kuwahara, Ibaraki (JP); Takayuki Shima, Ibaraki (JP); Junji Tominaga, Ibaraki (JP); Takashi Kikukawa, Tokyo (JP); Narutoshi Fukuzawa, Tokyo (JP); Tatsuhiro Kobayashi, Tokyo (JP)

(73) Assignee: TDK Corporation, Tokyo (JP)

( * ) Notice: Subject to any disclaimer, the term of this patent is extended or adjusted under 35 U.S.C. 154(b) by 857 days.

(21) Appl. No.: 10/929,894

(22) Filed: Aug. 30, 2004

(65) Prior Publication Data

US 2005/0105418 A1 May 19, 2005

(30) Foreign Application Priority Data

Oct. 31, 2003 (JP) ............................. 2003-371626

(51) Int. Cl.
 *G11B 7/00* (2006.01)
(52) U.S. Cl. .................................................. 369/47.53
(58) Field of Classification Search ................ 369/47.5, 369/47.51, 47.52, 47.53, 116, 59.11, 53.26
See application file for complete search history.

(56) References Cited

U.S. PATENT DOCUMENTS 6,052,347 A * 4/2000 Miyata .................... 369/47.53
6,292,448 B1 * 9/2001 Yoshida et al. ............ 369/47.53
6,430,128 B1 * 8/2002 Kato et al. ................ 369/47.53
6,600,715 B2 * 7/2003 Okumura et al. .......... 369/275.1
6,845,074 B1 * 1/2005 Fujita ...................... 369/59.17
6,965,556 B1 * 11/2005 Kikukawa et al. ........... 369/284
6,975,571 B1 * 12/2005 Narumi et al. ............ 369/47.53
7,053,919 B2 * 5/2006 Nagano .................... 369/47.53
7,068,579 B2 * 6/2006 Tasaka et al. ............... 369/116
7,166,346 B2 * 1/2007 Kim et al. ................... 428/64.4
7,254,101 B2 * 8/2007 Kato et al. ................ 369/47.53
7,301,870 B2 * 11/2007 Masui ..................... 369/47.53
2005/0152247 A1 * 7/2005 Minechika et al. ........ 369/47.53

OTHER PUBLICATIONS

*Extended Abstracts* (The 64th Autumn Meeting, 2003); The Japan Society of Applied Physics No. 3, Aug. 30-Sep. 2, 2003, JSAP Catalog No. AP 031129-03, 5 pg.

* cited by examiner

*Primary Examiner*—Thang V Tran
(74) *Attorney, Agent, or Firm*—Seed IP Law Group PLLC

(57) ABSTRACT

A method for determining a read power of a laser beam includes a step of setting a power of a laser beam to a recommended recording power Pw' and forming a recording mark train including at least one of a recording mark having a length shorter than a resolution limit and a blank region having a length shorter than the resolution limit in an optical recording disc, thereby recording test data therein. The method also includes a step of setting the power of the laser beam to a recommended read power Pr' and reproducing the test data recorded in the optical recording disc, a step of judging whether or not signal characteristics of a reproduced signal obtained by reproducing the test data satisfies reference conditions, and determining an optimum read power of the laser beam based on the result of the judgment.

16 Claims, 10 Drawing Sheets

METHOD FOR DETERMINING A REPRODUCING POWER OF A LASER BEAM AND AN APPARATUS FOR RECORDING AND REPRODUCING DATA

BACKGROUND OF THE INVENTION

The present invention relates to a method for determining the read power of a laser beam for reproducing data recorded in an optical recording disc and an apparatus for recording data in and reproducing data from an optical recording disc and, particularly, to a method for determining the read power of a laser beam and an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

DESCRIPTION OF THE PRIOR ART

Optical recording discs such as the CD, DVD and the like have been widely used as recording media for recording digital data and a optical recording disc that offers improved recording density and has an extremely high data transfer rate has been recently developed.

In such an optical recording disc, the storage capacity of the optical recording disc is improved by reducing a wavelength $\lambda$ of a laser beam used for recording and reproducing data and increasing a numerical aperture NA of an objective lens, thereby reducing the diameter of the laser beam spot.

In an optical recording disc, in the case where the length of a recording mark formed in the optical recording disc and the length between neighboring recording marks, namely, the length of a region (hereinafter referred to as "a blank region") where no recording mark is formed are shorter than the resolution limit, data cannot be reproduced from the optical recording disc.

The resolution limit is determined by the wavelength $\lambda$ of a laser beam and the numerical aperture NA of an objective lens for converging the laser beam and in the case where the frequency of repetition of a recording mark and a blank region, namely, the spatial frequency, is equal to or larger than $2NA/\lambda$, data recorded in the recording mark and the blank region cannot be read.

Therefore, the length of the recording mark and the blank region corresponding to the spatial frequency which can be read both become equal to or larger than $\lambda/4NA$ and in the case where an objective lens having a numerical aperture NA is used to converge a laser beam having a wavelength $\lambda$ on the surface of an optical recording disc, a recording mark having a length of $\lambda/4NA$ and a blank region having a length of $\lambda/4NA$ are the shortest recording mark and the shortest blank region which can be read.

Thus when data recorded in an optical recording disc are to be reproduced, there exists a resolution limit within which data can be read and the length of a recording mark and the length of a blank region which can be read are restricted. Therefore, if a recording mark having a length shorter than the resolution limit and a blank region having a length shorter than the resolution limit are formed in an optical recording disc, thereby recording data therein, the thus recorded data cannot be reproduced, so that the length of a recording mark and the length of a blank region which can be formed for recording data in an optical recording disc are inevitably restricted and a recording mark having a length shorter than the resolution limit and a blank region having a length shorter than the resolution limit are not normally formed in an optical recording disc to record data therein.

Therefore, in order to increase the storage capacity of an optical recording disc, it is required to shorten the wavelength $\lambda$ of the laser beam used for reproducing data or increase the numerical aperture NA of the objective lens, thereby decreasing the resolution limit so that data consisting of a recording mark having a shorter length and a blank region having a shorter length can be reproduced.

However, there is a limit to how far the wavelength $\lambda$ of the laser beam used for reproducing data can be shortened and how far the numerical aperture NA of the objective lens can be increased, so that the increase in the storage capacity of an optical recording disc that can be achieved by decreasing the resolution limit is limited.

Further, even if the storage capacity of an optical recording disc can somehow be increased, this alone is not sufficient because it is further necessary to ensure that a reproduced signal having good signal characteristic can be obtained by reproducing the data recorded in the optical recording disc.

SUMMARY OF THE INVENTION

It is therefore an object of the present invention to provide a method for determining the read power of a laser beam applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

It is another object of the present invention to provide an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

The above objects of the present invention can be accomplished by a method for determining a read power of a laser beam to be irradiated onto an optical recording disc comprising a multi-layered body formed by forming a decomposition reaction layer containing noble metal oxide as a primary component and a light absorption layer so as to sandwich at least a dielectric layer therebetween and reproduce data recorded in the optical recording disc by forming a recording mark train including at least one of a recording mark having a length shorter than a resolution limit and a blank region having a length shorter than the resolution limit therein, which method for determining a read power of a laser beam comprises a first step of setting a power of the laser beam to a recommended recording power determined in advance, irradiating the laser beam whose power is set to the recommended recording power onto the optical recording disc and forming a recording mark train including at least one of a recording mark having a length shorter than a resolution limit and a blank region having a length shorter than the resolution limit, thereby recording test data therein, a second step of setting a power of the laser beam to a recommended read power determined in advance, irradiating the laser beam whose power is set to the recommended read power onto the optical recording disc and reproducing the test data recorded in the optical recording disc, a third step of judging whether or not signal characteristics of a reproduced signal obtained by reproducing the test data satisfies reference conditions, and a fourth step of changing the power of the laser beam for reproducing the test data when the signal characteristics of the reproduced signal do not satisfy the reference conditions and determining the power of the laser beam as an optimum read power when the signal characteristics of the reproduced signal satisfy the reference conditions.

In the present invention, the optical recording disc includes a multi-layered body formed by forming a decomposition reaction layer containing noble metal oxide as a primary component and a light absorption layer so as to sandwich at least a dielectric layer therebetween.

In the optical recording disc having such configuration, when the laser beam is irradiated thereonto, a void is formed and fine particles of noble metal precipitate into the void, thereby forming a recording mark in the decomposition reaction layer.

In a study done by the inventors of the present invention, it was found that in the case where data were recorded in the optical recording disc in this manner, even in the case where the length of a recording mark or the length of a blank region between neighboring recording marks constituting a recording mark train was shorter than the resolution limit, data recorded in the optical recording disc could be reproduced by converging the laser beam using an objective lens onto the optical recording disc via a light incidence plane of the laser beam.

Although it is not altogether clear why, in the case where the laser beam is irradiated onto the optical recording disc, the void is formed in the decomposition reaction layer and fine particles of noble metal precipitate into the void, thereby forming a recording mark in the decomposition reaction layer, it is possible to reproduce data recorded in the optical recording disc even in the case where the length of a recording mark or the length of a blank region between neighboring recording marks constituting a recording mark train is shorter than the resolution limit, it is reasonable to conclude that near-field light is generated by irradiating the laser beam for reproducing data onto the fine particles of noble metal and the resolution limit disappears or that the resolution limit becomes smaller due to the interaction between the fine particles of noble metal precipitated into the void and the laser beam irradiated onto the fine particles of noble metal.

In a further study done by the inventors of the present invention, it was found that in the case of an optical recording disc constituted so that a void was formed in the decomposition reaction layer, fine particles of noble metal precipitated into the void when a laser beam was irradiated thereonto and a recording mark having a length shorter than the resolution limit and a blank region having a length shorter than the resolution limit were formed in the decomposition reaction layer, thereby recording data therein, it was impossible to reproduce the data recorded therein unless the power of the laser beam was set higher than a predetermined power but the signal characteristics of the reproduced signal became worse if the power of the laser beam was set too high.

Therefore, in order to reproduce in a desired manner data recorded in the optical recording disc by forming a void in the decomposition reaction layer and precipitating fine particles of noble metal in response to irradiation with the laser beam, thereby forming a recording mark having a length shorter than the resolution limit and a blank region having a length shorter than the resolution limit in decomposition reaction layer, it is necessary to control the level of the read power of the laser beam prior to reproducing recorded data to a level suitable for reproducing the recorded data.

According to the present invention, the method of determining the read power of the laser beam comprises steps of setting the power of the laser beam to a recommended recording power determined in advance, irradiating the laser beam whose power is set to the recommended recording power onto the optical recording disc, forming a recording mark train including at least one of a recording mark having a length shorter than a resolution limit and a blank region having a length shorter than the resolution limit, thereby recording test data therein, setting the power of the laser beam to a recommended read power determined in advance, irradiating the laser beam whose power is set to the recommended read power onto the optical recording disc, reproducing the test data recorded in the optical recording disc, judging whether or not signal characteristics of the reproduced signal obtained by reproducing the test data satisfy reference conditions, changing the power of the laser beam for reproducing the test data when the signal characteristics of the reproduced signal satisfy the reference conditions and determining the power of the laser beam as the optimum read power when the signal characteristics of the reproduced signal satisfy the reference conditions, so that it is possible to control the level of the read power of the laser beam prior to reproducing recorded data to a level suitable for reproducing the recorded data, and therefore, data recorded in the optical recording disc by forming a recording mark having a length shorter than a resolution limit and a blank region having a length shorter than the resolution limit therein can be reproduced in a desired manner.

In a preferred aspect of the present invention, the third step is constituted by judging whether or not resolution of the reproduced signal obtained by reproducing the test data satisfies the reference conditions.

Since the resolution of the reproduced signal is determined depending upon the level of the read power of the laser beam used for reproducing data recorded in the optical recording disc, it is preferable to judge whether or not the read power of the laser beam is optimum by judging whether or not the resolution of the reproduced signal obtained by reproducing the test data satisfies the reference conditions.

In a preferred aspect of the present invention, the method of determining a read power of a laser beam further comprises between the first step and the second step a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, and the second step is constituted by irradiating the laser beam whose power is set to the recommended read power onto the optical recording disc and reproducing test data recorded using a laser beam having the optimum recording power determined at the seventh step.

In another preferred aspect of the present invention, the method of determining a read power of a laser beam further comprises after the fourth step a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions.

In a preferred aspect of the present invention the sixth step is constituted by judging whether or not a β value obtained by reproducing the test data satisfies the reference conditions.

Since the β value obtained by reproducing the test data is determined depending upon the level of the read power of the laser beam used for reproducing data recorded in the optical recording disc, it is preferable to judge whether or not the read power of the laser beam is optimum by judging whether or not the β value obtained by reproducing the test data satisfies the reference conditions.

In the present invention, it is preferable for the noble metal oxide contained in the decomposition reaction layer of the optical recording disc as a primary component to be decomposed into noble metal and oxygen when the laser beam is irradiated onto the optical recording disc.

In the present invention, the noble metal oxide contained in the decomposition reaction layer of the optical recording disc is not particularly limited but oxide containing at least one noble metal selected from a group consisting of Ag, Pt and Pd is preferably selected from the viewpoint of easy formation of oxide and the efficiency of generating near-field light, and platinum oxide ($PtO_2$) is particularly preferable since the decomposition temperature thereof is high.

Platinum oxide ($PtO_2$) has a higher decomposition temperature than those of other noble metal oxides. Therefore, when a laser beam whose power is set to that for recording data is irradiated onto the optical recording disc, thereby forming a recording mark, since it is possible to prevent heat from transferring from a region of the decomposition reaction layer irradiated with the laser beam to other regions therearound and prevent a decomposition reaction of platinum oxide $PtO_2$ from occurring at regions other than the region irradiated with the laser beam, it is possible to form a void in the decomposition reaction layer, thereby forming a recording mark.

Further, since platinum oxide ($PtO_2$) has a higher decomposition temperature than those of other noble metal oxides, even in the case where a laser beam having a high power for reproducing data is irradiated onto the optical recording disc, thereby reproducing data, there is no risk of platinum oxide decomposing into platinum and oxygen. Therefore, even in the case of repeatedly reproducing data recorded in the optical recording disc, a void can be formed without change in the shape of a recording mark and a new void is not formed at regions other than a region where the recording mark is formed. Accordingly, it is possible to improve the reproduction durability of an optical recording disc.

In the present invention, in order to obtain a reproduced signal having a high C/N ratio even in the case where the length of a recording mark or the length of a blank region between neighboring recording marks is shorter than the resolution limit, it is preferable for x in the general formula of platinum oxide: $PtO_x$ to be equal to or larger than 0.5 and equal to or smaller than 4.0 and more preferable for x to be equal to or larger than 1.0 and smaller than 3.

In the present invention, in the case where silver oxide $AgO_y$ is employed as noble metal oxide, it is preferable for y to be equal to or larger than 0.5 and equal to or smaller than 1.5 and more preferable for y to be equal to or larger than 0.5 and equal to or smaller than 1.0.

In the present invention, the void is preferably formed in the decomposition reaction layer by oxygen gas generated when the laser beam is irradiated onto the optical recording disc.

In the present invention, it is preferable for each fine particle of platinum formed by the decomposition of platinum oxide to have a particle size smaller than the void to be formed in the decomposition reaction layer. In the case where each fine particle of platinum formed by the decomposition of platinum oxide has a particle size sufficiently smaller than the void to be formed in the decomposition reaction layer, it is possible to effectively prevent the shape of the void from being affected by fine particles of platinum precipitating into the void and prevent a recording mark from being undesirably deformed.

In the present invention, the light absorption layer is constituted so as to absorb a laser beam irradiated thereonto via a light transmission layer and generate heat.

In the case where the light absorption layer is constituted so as to absorb a laser beam irradiated thereonto via a light transmission layer and generate heat, even if the decomposition reaction layer is does not readily generate heat when the laser beam is irradiated thereonto, it is possible to decompose noble metal oxide contained in the decomposition reaction layer as a primary component into noble metal and oxygen by heat transferred from the light absorption layer. Therefore, even if the decomposition reaction layer is formed thin so as to be easily deformed or even if the decomposition reaction layer contains noble metal oxide having high light transmittance with respect to a laser beam, it is possible to decompose noble metal oxide in a desired manner by irradiating the laser beam onto the decomposition reaction layer, thereby forming a recording mark therein.

In the present invention, the light absorption layer preferably contains a material having a high absorption coefficient with respect to a laser beam and low thermal conductivity and more preferably contains at least one of Sb and Te.

In the present invention, as an alloy contained in the light absorption layer and containing at least one of Sb and Te, an alloy represented by the general formula: $(Sb_aTe_{1-a})_{1-b}M_b$ or ${(GeTe)_c(Sb_2Te_3)_{1-d}}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer becomes lower than the required value and the thermal conductivity thereof becomes lower than the required value.

The element M is not particularly limited but it is preferable for the element M to be at least one element selected from a group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy which contains at least one of Sb and Te and is contained in the light absorption layer is represented by the general formula: ${(GeTe)_c(Sb_2Te_3)_{1-d}}_dX_{1-d}$, it is preferable for c and d to be such that c is equal to or larger than ⅓ and equal to or smaller than ⅔ and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

In the present invention, it is preferable for the dielectric layer and the light absorption layer to be deformed when the laser beam is irradiated onto the optical recording disc, whereby the decomposition reaction layer is decomposed into noble metal and oxygen and the void is formed.

Since deformed regions of the dielectric layer and the light absorption layer have different optical characteristics from regions which are not deformed, it is possible to further improve the C/N ratio of the reproduced signal.

The above objects of the present invention can be also accomplished by an apparatus for recording and reproducing data adapted for irradiating a laser beam onto an optical recording disc comprising a multi-layered body formed by forming a decomposition reaction layer containing noble metal oxide as a primary component and a light absorption layer so as to sandwich at least a dielectric layer therebetween, forming a recording mark train including at least one of a recording mark having a length shorter than a resolution limit and a blank region having a length shorter than the resolution limit therein, thereby recording data therein and reproducing the thus recorded data, the apparatus for recording and reproducing data comprising an irradiating means for irradiating the laser beam onto the optical recording disc and a control means for controlling a power of the laser beam, the control means being constituted so as to control the power of the laser beam in accordance with a first step of setting a power of the laser beam to a recommended recording power determined in advance, irradiating the laser beam whose power is set to the recommended recording power onto the optical recording disc and forming a recording mark train including at least one of a recording mark having a length shorter than a resolution limit and a blank region having a length shorter than the resolution limit, thereby recording test data therein, a second step of setting a power of the laser beam to a recommended read power determined in advance, irradiating the laser beam whose power is set to the recommended read power onto the optical recording disc and reproducing the test data recorded in the optical recording disc, a third step of judging whether or not signal characteristics of a reproduced signal obtained by reproducing the test data satisfy reference conditions, and a fourth step of changing the power of the laser beam for reproducing the test data when the signal characteristics of the reproduced signal do not satisfy the reference conditions and determining the power of the laser beam as an optimum read power when the signal characteristics of the reproduced signal satisfy the reference conditions, set the power of the laser beam to the optimum read power determined at the fourth step and reproduce data recorded in the optical recording disc.

In a preferred aspect of the present invention the control means is constituted so as to judge whether or not resolution of the reproduced signal obtained by reproducing the test data satisfies the reference conditions at the third step.

In a preferred aspect of the present invention, the control means is constituted so as to perform, between the first step and the second step, a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

In a preferred aspect of the present invention, the control means is constituted so as to perform, after the fourth step, a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

In a preferred aspect of the present invention, the control means is constituted so as to judge whether or not a B value obtained by reproducing the test data satisfies the reference conditions at the sixth step.

The above and other objects and features of the present invention will become apparent from the following description made with reference to the accompanying drawings.

DESCRIPTION OF THE PREFERRED EMBODIMENTS

Figure 1:
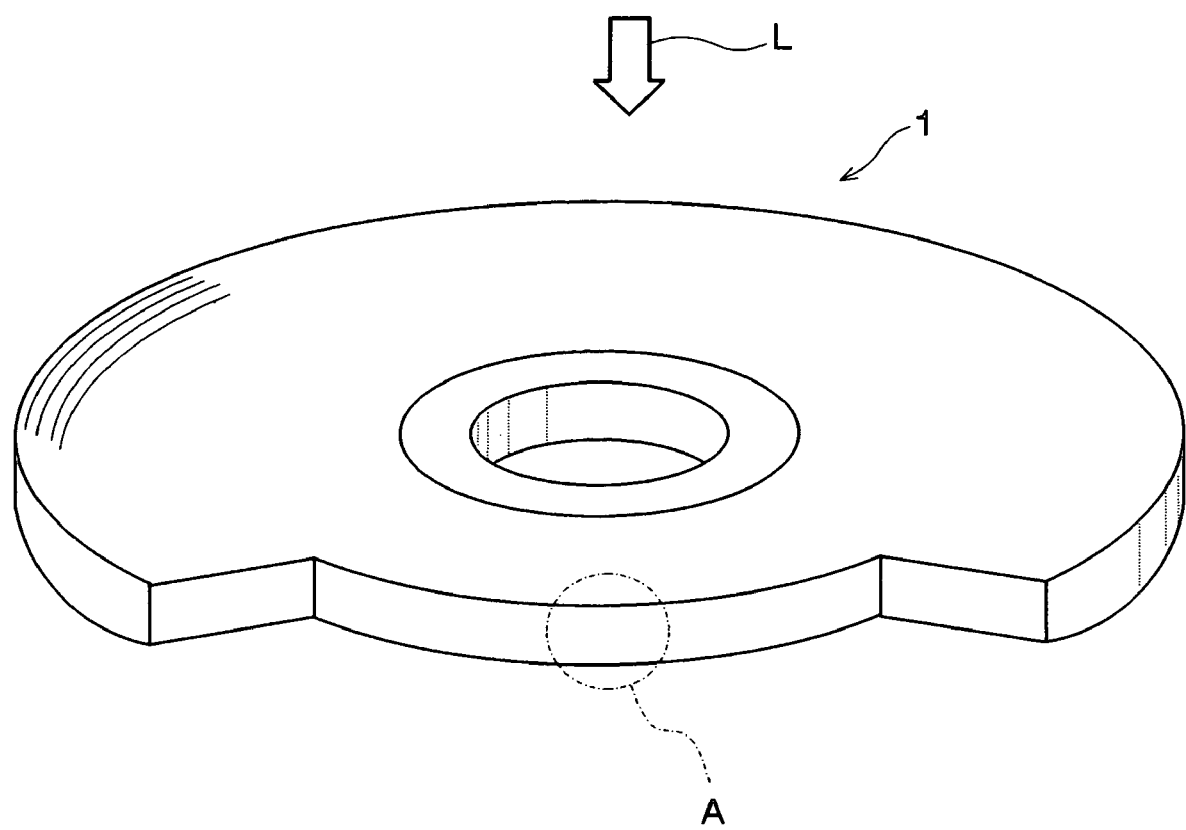
FIG. 1 is a schematic perspective view showing an optical recording disc that is a preferred embodiment of the present invention.
Figure 2:
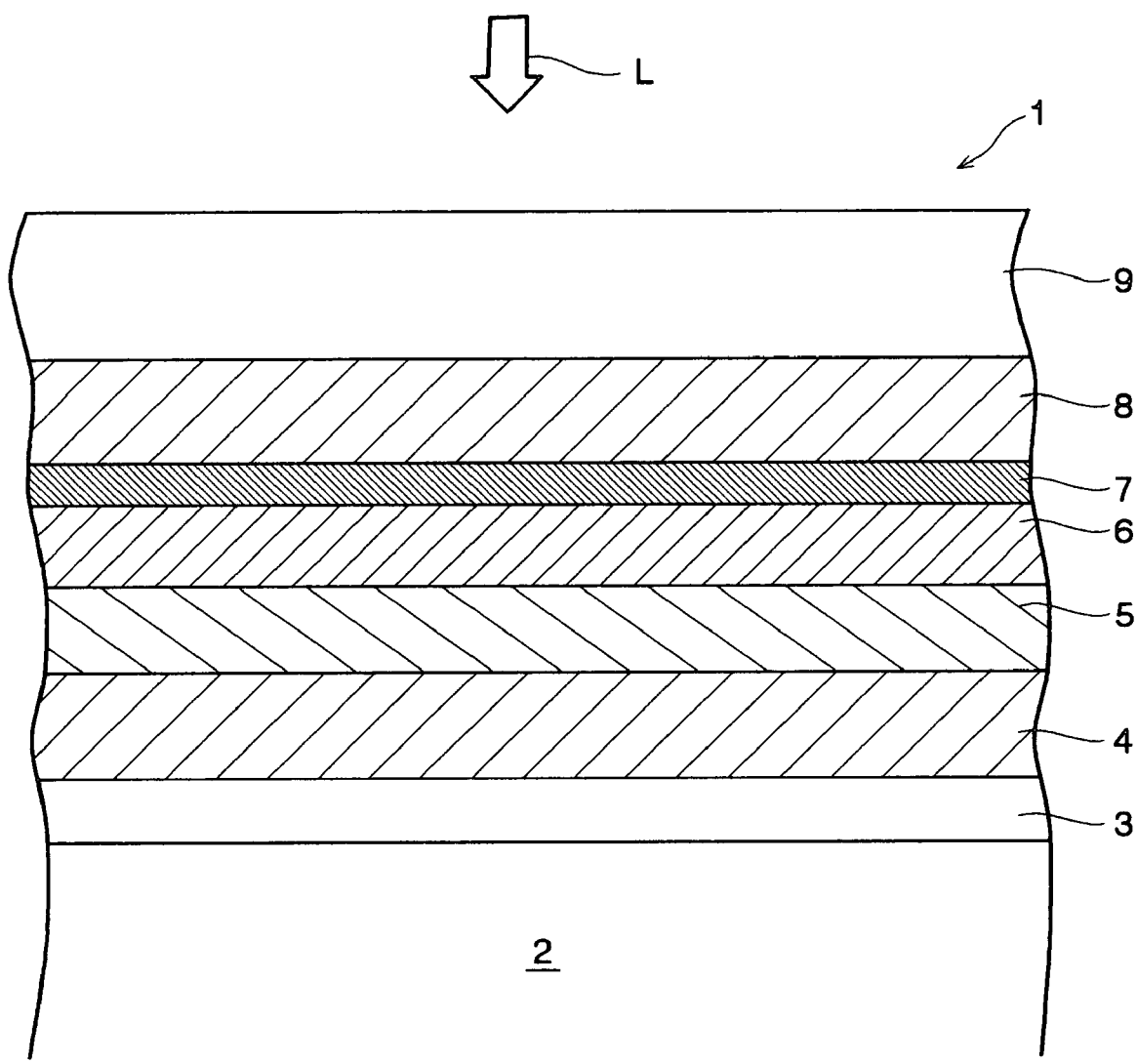
FIG. 2 is an enlarged schematic cross-sectional view of the part of the optical recording disc in FIG. 1 indicated by A within a cross section taken along the track of the optical recording disc.

FIG. 1 is a schematic perspective view showing an optical recording disc that is a preferred embodiment of the present invention and FIG. 2 is an enlarged schematic cross-sectional view of the part of the optical recording disc in FIG. 1 indicated by A within a cross section taken along the track of the optical recording disc.

As shown in FIG. 2, an optical recording disc 1 includes a support substrate 2, and a reflective layer 3, a third dielectric layer 4, a light absorption layer 5, a second dielectric layer 6, a decomposition reaction layer 7, a first dielectric layer 8 and a light transmission layer 9 are laminated on the support substrate 2 in this order.

In this embodiment, the optical recording disc 1 is constituted so that data are recorded and data recorded therein are reproduced by irradiating a laser beam L thereonto from the side of the light transmission layer 9. The laser beam L has a wavelength of 390 nm to 420 nm and is converged onto the optical recording disc 1 using an objective lens having a numerical aperture of 0.7 to 0.9.

The support substrate 2 serves as a support of the optical recording disc 1 for ensuring mechanical strength required for the optical recording disc 1.

The material used to form the support substrate 2 is not particularly limited insofar as the support substrate 2 can serve as the support of the optical recording disc 1. The support substrate 2 can be formed of glass, ceramic, resin or the like. Among these, resin is preferably used for forming the support substrate 11 since resin can be easily shaped. Illustrative examples of resins suitable for forming the support substrate 11 include polycarbonate resin, olefin resin, acrylic resin, epoxy resin, polystyrene resin, polyethylene resin, polypropylene resin, silicone resin, fluoropolymers, acrylonitrile butadiene styrene resin, urethane resin and the like. Among these, polycarbonate resin and olefin resin are most preferably used for forming the support substrate 2 from the viewpoint of easy processing, optical characteristics and the like.

In this embodiment, the support substrate 2 is formed of polycarbonate resin and has a thickness of 1.1 mm.

As shown in FIG. 2, the reflective layer 6 is formed on the surface of the support substrate 2 of the optical recording disc 1.

The reflective layer 3 serves to reflect the laser beam L entering through the light transmission layer 9 so as to emit it from the light transmission layer 9.

The material usable for forming the reflective layer 3 is not particularly limited and the reflective layer 3 can be formed of at least one kind of element selected from a group consisting of Au, Ag, Cu, Pt, Al, Ti, Cr, Fe, Co, Ni, Mg, Zn, Ge, Si, Pd and Nd.

The thickness of the reflective layer 3 is not particularly limited but it is preferable to form the reflective layer 3 so as to have a thickness of 5 nm to 200 nm.

As shown in FIG. 2, the third dielectric layer 4 is formed on the surface of the reflective layer 3 of the optical recording disc 1.

In this embodiment, the third dielectric layer 4 serves to protect the support substrate 2 and the reflective layer 3 and also physically and chemically protect the light absorption layer 5 formed thereon.

The dielectric material usable for forming the third dielectric layer 4 is not particularly limited and the third dielectric layer 4 is formed of a dielectric material containing oxide, sulfide, nitride or the combination thereof as a primary component. It is preferable to form the third dielectric layer 4 of oxide, nitride, sulfide or fluoride containing at least one element selected from a group consisting of Si, Zn, Al, Ta, Ti, Co, Zr, Pb, Ag, Sn, Ca, Ce, V, Cu, Fe and Mg, or a combination thereof.

The third dielectric layer 4 can be formed on the reflective layer 3 by a gas phase growth process using chemical species containing elements for forming the third dielectric layer 4. Illustrative examples of the gas phase growth processes include vacuum deposition process, sputtering process and the like.

The thickness of the third dielectric layer 4 is not particularly limited but it is preferable to form the third dielectric layer 4 so as to have a thickness of 10 nm to 140 nm.

As shown in FIG. 2, the light absorption layer 5 is formed on the surface of the third dielectric layer 4 of the optical recording disc 1.

In this embodiment, the light absorption layer 5 serves to absorb a laser beam L whose power is set to the recording power and which is irradiated onto the optical recording disc 1, generate heat and transfer the thus generated heat to the decomposition reaction layer 7.

In this embodiment, the light absorption layer 5 is formed of an alloy containing one of Sb and Te having a high light absorption coefficient and low thermal conductivity.

As an alloy contained in the light absorption layer 5 and containing one of Sb and Te, an alloy represented by the general formula: $(Sb_aTe_{1-a})_{1-b}M_b$ or $\{(GeTe)_c(Sb_2Te_3)_{1-d}\}_dX_{1-d}$ is particularly preferable. Here, the element M represents an element other than Sb and Te and the element X represents an element other than Sb, Te and Ge.

In the case where the alloy which contains at least one of Sb and Te and is contained in the light absorption layer 5 is represented by the general formula: $(Sb_aTe_{1-a})_{1-b}M$, it is preferable for a and b to be such that a is equal to or larger than 0 and equal to or smaller than 1 and that b is equal to or larger than 0 and equal to or smaller than 0.25. In the case where b is larger than 0.25, the light absorption coefficient of the light absorption layer 5 becomes lower than the required value and the thermal conductivity thereof becomes lower than the required value required.

The element M is not particularly limited but it is preferable for the element M to be at least one element selected from the group consisting of In, Ag, Au, Bi, Se, Al, Ge, P, H, Si, C, V, W, Ta, Zn, Mn, Ti, Sn, Pb, Pd, N, O and rare earth elements (Sc, Y and lanthanoid) as a primary component.

On the other hand, in the case where the alloy contained in the light absorption layer 5 and containing at least one of Sb and Te is represented by the general formula: $\{(GeTe)_c(Sb_2Te_3)_{1-d}\}_dX_{1-d}$, it is preferable for c and d to be such that c is equal to or larger than ⅓ and equal to or smaller than ⅔ and d is equal to or larger than 0.9.

The element X is not particularly limited but it is preferable for the element X to be at least one element selected from a group consisting of In, Ag, Au, Bi, Se, Al, Ge, P, H, Si, C, V, W, Ta, Zn, Mn, Ti, Sn, Pb, Pd, N, O and rare earth elements as a primary component.

In the case where a laser beam having a wavelength λ of 380 nm to 450 nm is employed, it is particularly preferable for the element M to be at least one element selected from a group consisting of Ag, In, Ge and rare earth elements and it is particularly preferable for the element X to be at least one element selected from a group consisting of Ag, In and rare earth elements.

The light absorption layer 5 can be formed on the surface of the third dielectric layer 4 by a gas phase growth process using chemical species containing elements for forming the light absorption layer 5. Illustrative examples of the gas phase growth processes include vacuum deposition process, sputtering process and the like.

It is preferable for the light absorption layer 5 to have a thickness of 5 nm to 100 nm. In the case where the thickness of the light absorption layer 5 is smaller than 5 nm, the amount of light absorbed therein becomes too small and on the other hand, in the case where the thickness of the light absorption layer 5 is larger than 100 nm, the light absorption layer 5 does not readily deform when a void is formed in the decomposition reaction layer 7 as described later.

As shown in FIG. 2, the second dielectric layer 6 is formed on the surface of the light absorption layer 5 of the optical recording disc 1.

In this embodiment, the second dielectric layer 6 serves to physically and chemically protect the decomposition reaction layer 7 in cooperation with the first dielectric layer 8.

The material usable for forming the second dielectric layer 6 is not particularly limited and the second dielectric layer 6 can be formed of the same material used for forming the third dielectric layer 4. The second dielectric layer 6 can be formed by a gas phase growth process similarly to the third dielectric layer 4.

It is preferable to form the second dielectric layer 6 so as to have a thickness of 5 nm to 100 nm.

As shown in FIG. 2, the decomposition reaction layer 7 is formed on the surface of the second dielectric layer 6 of the optical recording disc 1.

In this embodiment, the decomposition reaction layer 7 serves as a recording layer and a recording mark is formed in the decomposition reaction layer 7 when data are to be recorded in the optical recording disc 1.

In this embodiment, the decomposition reaction layer 7 contains platinum oxide ($PtO_x$) as a primary component.

In this embodiment, it is particularly preferable for x to be equal to or larger than 1.0 and smaller than 3.0 in order to obtain a reproduced signal having a high C/N ratio even in the case where the length of a recording mark or the length of a blank region between neighboring recording marks is shorter than the resolution limit.

The decomposition reaction layer 7 can be formed on the surface of the second dielectric layer 6 by a gas phase growth process using chemical species containing elements for forming the decomposition reaction layer 7. Illustrative examples of the gas phase growth processes include vacuum deposition process, sputtering process and the like.

It is preferable to form the decomposition reaction layer 7 so as to have a thickness of 2 nm to 50 nm.

As shown in FIG. 2, the first dielectric layer 8 is formed on the surface of the decomposition reaction layer 7 of the optical recording disc 1.

In this embodiment, the first dielectric layer 8 serves to physically and chemically protect the decomposition reaction layer 7.

The material usable for forming the first dielectric layer 8 is not particularly limited and the first dielectric layer 8 can be formed of the same material used for forming the third dielectric layer 4. The first dielectric layer 8 can be formed by a gas phase growth process similarly to the third dielectric layer 4.

As shown in FIG. 2, the light transmission layer 9 is formed on the surface of the first dielectric layer 8 of the optical recording disc 1.

The light transmission layer 9 is a layer through which the laser beam L is transmitted and the surface thereof forms a light incidence plane of the laser beam L.

It is preferable for the light transmission layer 9 to have a thickness of 10 μm to 200 μm and more preferable for the light transmission layer 9 to have a thickness of 50 μm to 150 μm.

The material for forming the light transmission layer 9 is not particularly limited insofar as it is optically transparent and have a low absorption ratio and a reflectivity with respect to a laser beam having a wavelength of 390 nm to 420 nm of the wavelength of the laser beam L, and a low birefringence factor. In the case where the light transmission layer 9 is formed using a spin coating method or the like, ultraviolet ray curable resin, electron beam curable resin, thermosetting resin or the like can be used for forming the light transmission layer 9 and activated energy ray curable type resin such as ultraviolet ray curable resin and electron beam curable resin is most preferably used for forming the light transmission layer 8.

The light transmission layer 9 may be formed by adhering a sheet formed of light transmittable resin onto the surface of the first dielectric layer 8 using an adhesive agent.

When the light transmission layer 9 is formed using a spin coating method, the thickness thereof is preferably 10 μm to 200 μm and when the light transmission layer 9 is formed by adhering a sheet formed of light transmittable resin onto the surface of the first dielectric layer 8 using an adhesive agent, the thickness thereof is preferably 50 μm to 150 μm.

Figure 3:
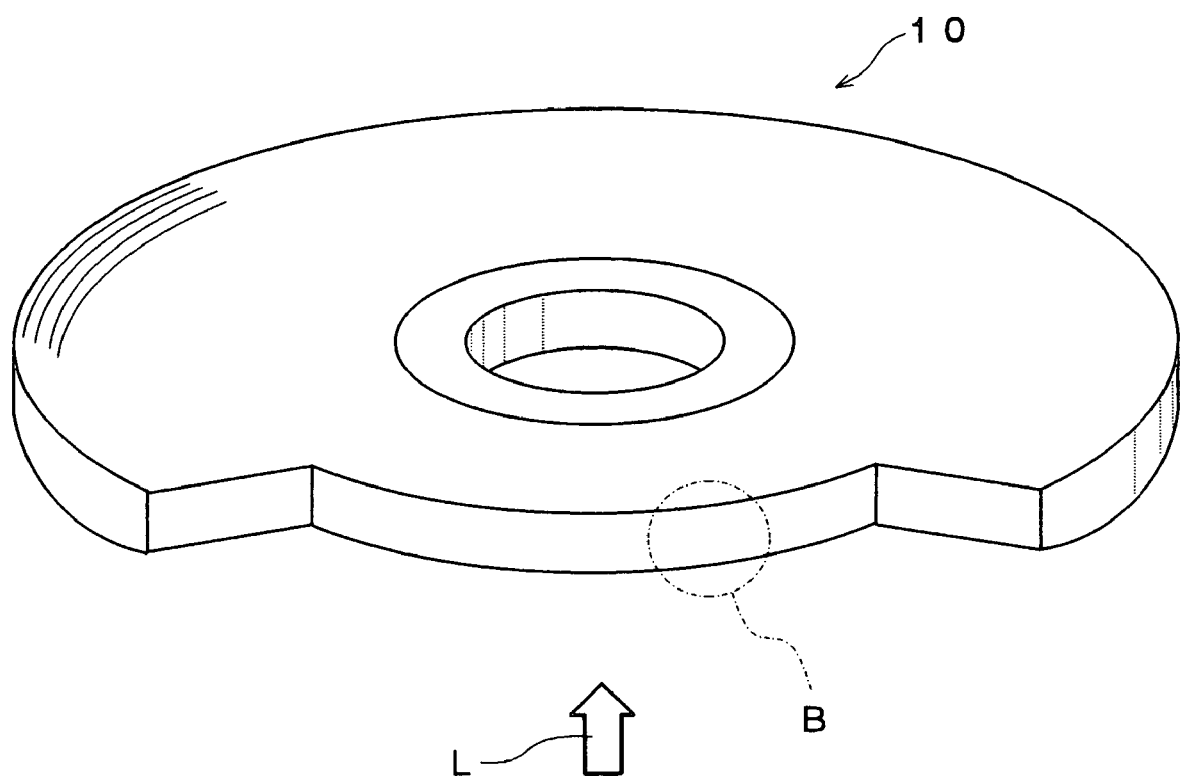
FIG. 3 is a schematic perspective view showing an optical recording disc that is another preferred embodiment of the present invention.
Figure 4:
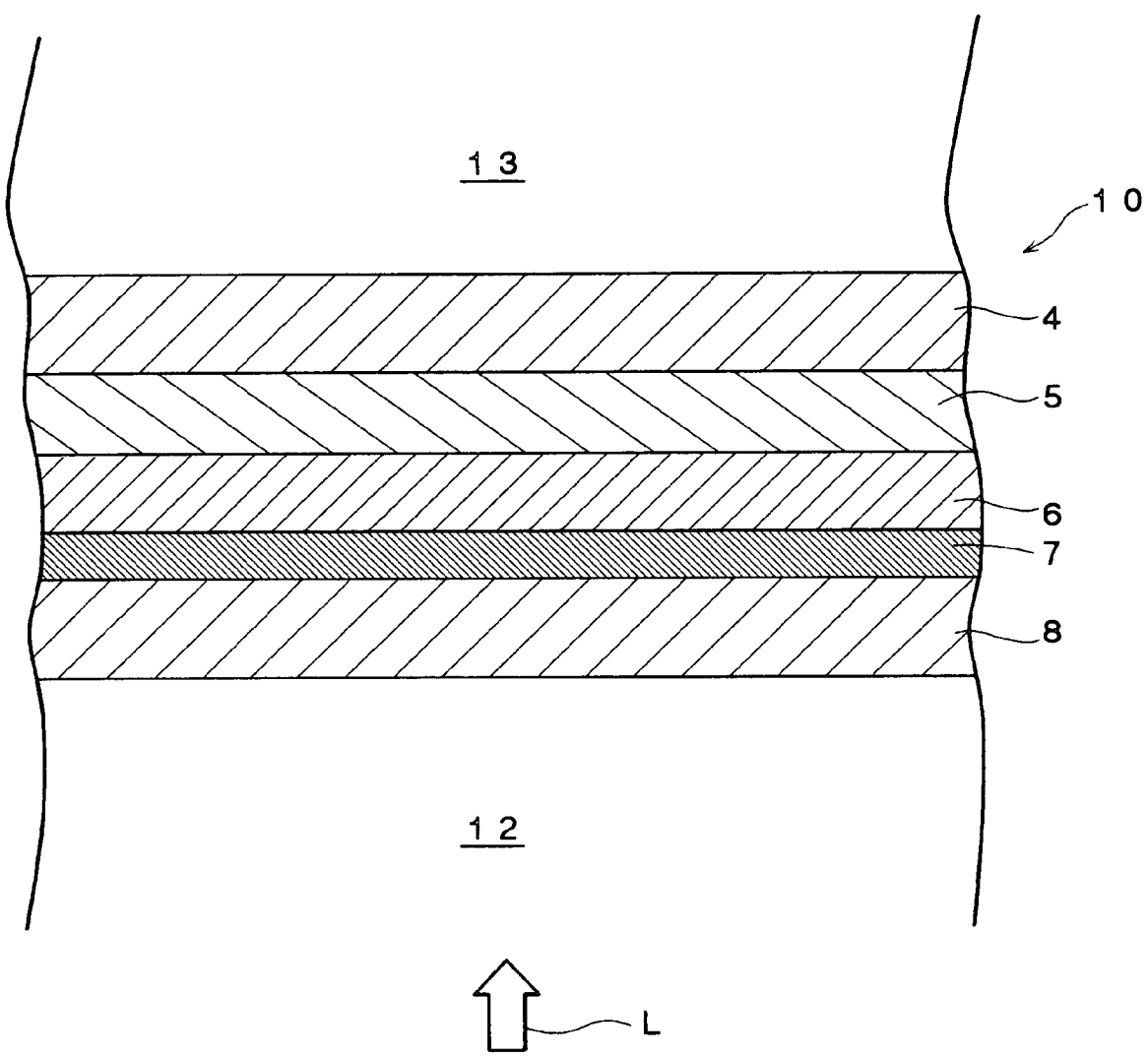
FIG. 4 is an enlarged schematic cross-sectional view of the part of the optical recording disc in FIG. 3 indicated by B within a cross section taken along the track of the optical recording disc.

FIG. 3 is a schematic perspective view showing an optical recording disc that is another preferred embodiment of the present invention and FIG. 4 is an enlarged schematic cross-sectional view of the part of the optical recording disc in FIG. 3 indicated by B within a cross section taken along the track of the optical recording disc.

As shown in FIG. 4, an optical recording disc 10 according to this embodiment includes a light transmissible substrate 12, and a first dielectric layer 8, a decomposition reaction layer 7, a second dielectric layer 6, a light absorption layer 5, a third dielectric layer 4 and a substrate 13 for adjusting the thickness of the optical recording disc 10 are laminated on the light transmissible substrate 12 in this order.

As shown in FIG. 4, the optical recording disc 10 is constituted so that data are recorded and data recorded therein are reproduced by irradiating a laser beam L thereonto from the side of the light transmissible substrate 12. The laser beam L has a wavelength of 630 nm to 675 nm and is converged onto the optical recording disc 1 using an objective lens having a numerical aperture of 0.59 to 0.66.

The light transmissible substrate 12 is a layer through which the laser beam L is transmitted when data are to be recorded in the decomposition reaction layer 7 and data recorded in the decomposition reaction layer 7 are to be reproduced and serves as a support of the optical recording disc 10 for ensuring mechanical strength required for the optical recording disc 10. The light transmissible substrate 12 is formed to be disc-like and so as to have a thickness of about 0.6 mm.

The material for forming the light transmissible substrate 12 is not particularly limited insofar as it is transmissible with respect to the laser beam L having a wavelength λ of 630 nm to 675 nm. The light transmissible substrate 12 can be formed of glass, ceramic, resin or the like, for example and it is particularly preferable to form the light transmissible substrate 12 of polycarbonate resin from the viewpoint of easy processing, optical characteristics and the like.

The substrate 13 for adjusting the thickness of the optical recording disc 10 is a disc-like substrate used for adjusting the thickness of the optical recording disc 1 so that the total thickness thereof is about 1.2 mm and is formed so as to have a thickness of about 0.6 mm. The substrate 13 for adjusting the thickness of the optical recording disc 10 also serves to improve the rigidity of the optical recording disc 10.

The material for forming the substrate 13 for adjusting the thickness of the optical recording disc 10 is not particularly limited and the substrate 13 for adjusting the thickness of the optical recording disc 10 can be formed of glass, ceramic, resin or the like similarly to the light transmissible substrate 12.

Data are recorded in and reproduced from the optical recording disc 1 shown in FIGS. 1 and 2 as set out in the following. Data can also be similarly recorded in and reproduced from the optical recording disc 10 shown in FIGS. 3 and 4.

Figure 5:
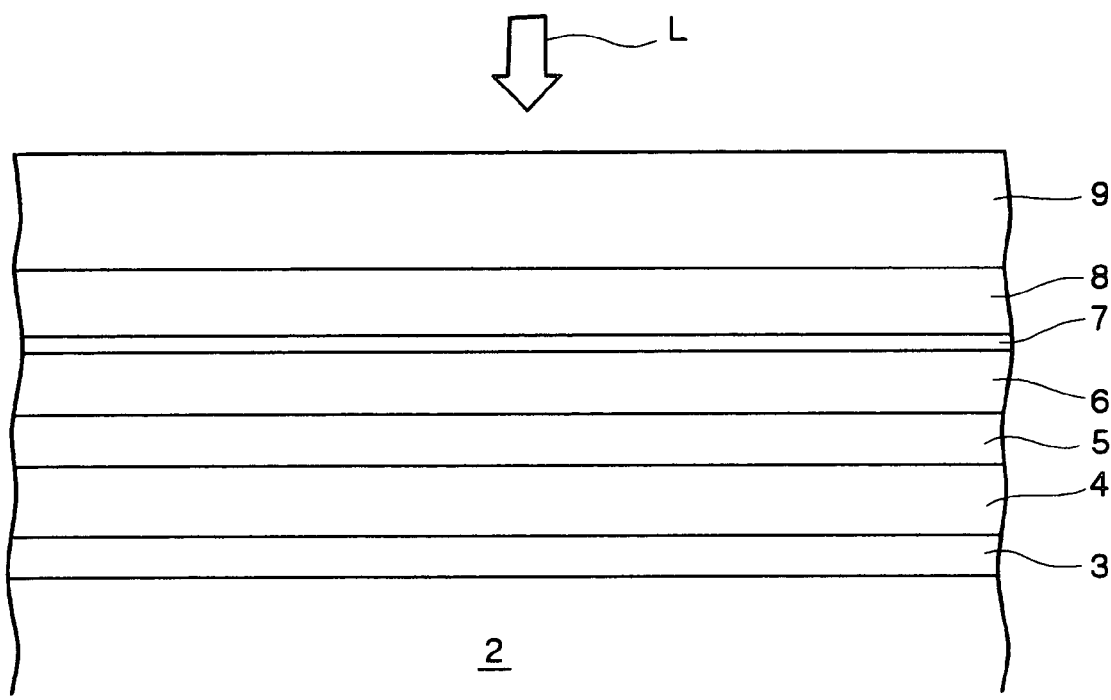
FIG. 5 is a partly enlarged schematic cross-sectional view of an optical recording disc before data are recorded therein.
Figure 6:
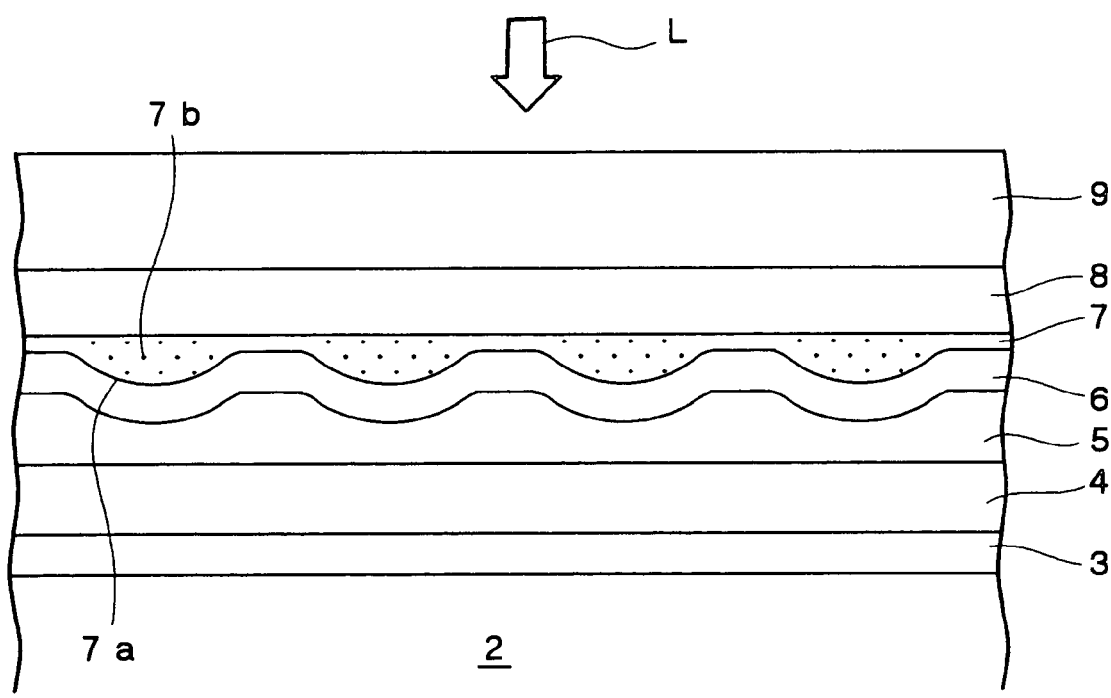
FIG. 6 is a partly enlarged schematic cross-sectional view of an optical recording disc after data were recorded therein.

FIG. 5 is a partly enlarged schematic cross-sectional view of an optical recording disc before data were recorded therein and FIG. 6 is a partly enlarged schematic cross-sectional view of an optical recording disc after data were recorded therein.

When data are to be recorded in the optical recording disc 1, a laser beam L is irradiated onto the optical recording disc 1 from the side of the light transmission layer 9.

When the laser beam L whose power is set to the recording power is irradiated onto the optical recording disc 1, since the light absorption layer 5 is formed of an alloy containing one of Sb and Te having a high light absorption coefficient, a region of the light absorption layer 5 irradiated with the laser beam L is heated.

Heat generated in the light absorption layer 5 is transferred to the decomposition reaction layer 7 and the temperature of the decomposition reaction layer 7 increases.

Thus, when the decomposition reaction layer 7 is heated to a temperature equal to or higher than the decomposition temperature of platinum oxide, the platinum oxide contained in the decomposition reaction layer 7 as a primary component is decomposed into platinum and oxygen.

As a result, as shown in FIG. 6, a void 7a is formed in the decomposition reaction layer 7 by oxygen gas generated by the decomposition of the platinum oxide and fine particles 7b of platinum precipitate into the void 7a.

Simultaneously, as shown in FIG. 6, the second dielectric layer 6 is deformed together with the decomposition reaction layer 7 by the pressure of the oxygen gas.

Since the region where the void 7a is formed and the second dielectric layer 6 and the decomposition reaction layer 7 are deformed in this manner has different optical properties from those of other regions, a recording mark is constituted by the region where the void 7a is formed and the second dielectric layer 6 and the decomposition reaction layer 7 are deformed.

In this embodiment, thus formed recording marks and blank regions between neighboring recording marks include ones having a length shorter than λ/4NA and a recording mark train including recording marks and blank regions having lengths shorter than the resolution limit is formed.

Further, in this embodiment, the decomposition reaction layer 7 contains platinum oxide having a high decomposition temperature as a primary component, so that when a laser beam L whose power is set to the recording power Pw is irradiated onto the optical recording disc 1 to form a recording mark, it is possible to prevent the decomposition reaction of platinum oxide from occurring in regions other than the region irradiated with the laser beam L even if heat is dissipated from the region of the decomposition reaction layer 7 irradiated with the laser beam L to regions of the decomposition reaction layer 7 therearound. Therefore, it is possible to form the void 7a at a desired region of the decomposition reaction layer 7 to form a recording mark therein.

Furthermore, in this embodiment, when the platinum oxide is decomposed and fine particles 7b of platinum precipitate into the void 7a, thereby forming a recording mark, since the particle size of each of the fine particles 7b of platinum is smaller than the size of the void 7a formed in the decomposition reaction layer 7, it is possible to effectively prevent the shape of the void 7a from being affected by fine particles 7b of platinum precipitating into the void 7a and prevent a recording mark from being undesirably deformed.

Thus, a recording mark train is formed in the optical recording disc 1, thereby recording data therein.

Data recorded in the optical recording disc 1 are reproduced in the following manner.

When data recorded in the optical recording disc 1 are to be reproduced, a laser beam L is irradiated onto the optical recording disc 1 from the side of the light transmission layer 9.

In a study done by the inventors of the present invention, it was found that in the case where data were recorded in the decomposition reaction layer 7 of the optical recording disc 1 in the above described manner, even when the length of a recording mark or the length of a blank region between neighboring recording marks constituting a recording mark train was shorter than the resolution limit, data could be reproduced by converging the laser beam L onto the optical recording disc 1 from the side of the light transmission layer 9.

Although it is not altogether clear why, in the case where the platinum oxide contained in the decomposition reaction layer 7 as a primary component is decomposed into platinum and oxygen, a void 7a is formed in the decomposition reaction layer 7 and fine particles 7b of platinum precipitate into the void 7a by the thus generated oxygen gas, thereby forming a recording mark in the decomposition reaction layer 7 and recording data in the optical recording disc 1, it is possible to reproduce data recorded in the optical recording disc 1 even in the case where the length of a recording mark or the length of a blank region between neighboring recording marks constituting a recording mark train is shorter than the resolution limit, it is reasonable to conclude that near-field light is generated by irradiating the laser beam L onto the fine particles 7b of platinum precipitated into the void 7a and the resolution limit disappears or that the resolution limit becomes smaller due to the interaction between the fine particles 7b of platinum precipitated into the void 7a and the laser beam L irradiated onto the fine particles 7b of platinum.

In a further study done by the inventors of the present invention, it was found that in the case of an optical recording disc 1 constituted so that the platinum oxide contained in the decomposition reaction layer 7 as a primary component was decomposed into platinum and oxygen to form a void 7a in the decomposition reaction layer 7 and cause fine particles 7b of platinum to precipitate into the void 7a by the thus generated oxygen gas, thereby forming a recording mark having a length shorter than the resolution limit and a blank region having a length shorter than the resolution limit in the decomposition reaction layer 7 and recording data therein, it was impossible to reproduce the data recorded therein unless the read power Pr of the laser beam L was set higher than a predetermined power but the signal characteristics of the reproduced signal became worse if the read power Pr of the laser beam L was set too high.

Therefore, in order to reproduce in a desired manner data recorded in the optical recording disc 1 by decomposing the platinum oxide contained in the decomposition reaction layer 7 as a primary component into platinum and oxygen, forming a void 7a in the decomposition reaction layer 7 and precipitating fine particles 7b of platinum into the void 7a by the thus generated oxygen gas, and forming a recording mark having a length shorter than the resolution limit and a blank region having a length shorter than the resolution limit in the decomposition reaction layer 7, it is necessary to control the level of the read power Pr of the laser beam L prior to reproducing the data recorded in the optical recording disc 1 to a level suitable for reproducing the data recorded therein.

Figure 7:
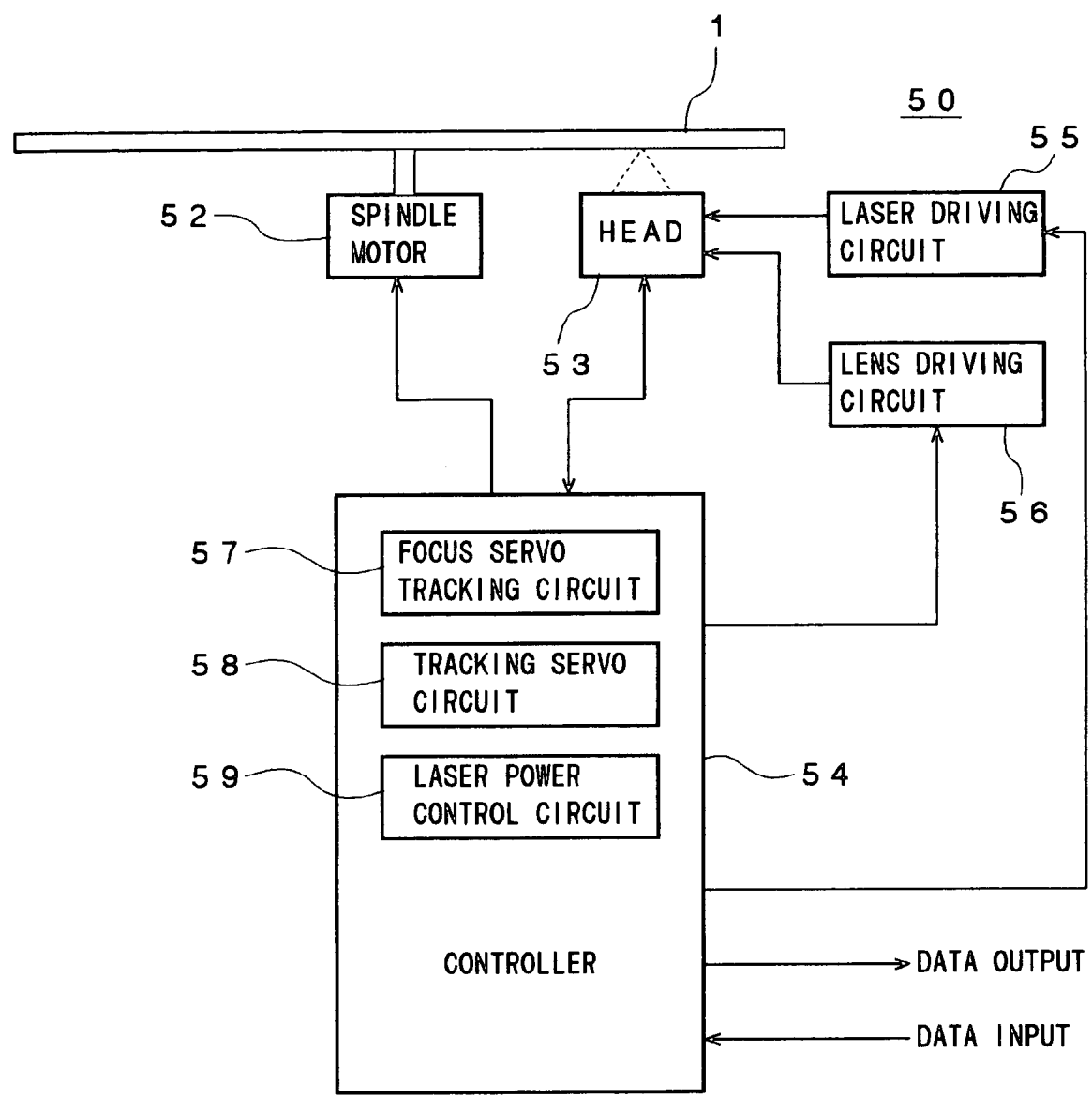
FIG. 7 is a block diagram showing a data recording and reproducing apparatus that is a preferred embodiment of the present invention.

FIG. 7 is a block diagram showing a data recording and reproducing apparatus that is a preferred embodiment of the present invention.

As shown in FIG. 7, a data recording and reproducing apparatus 50 according to this embodiment includes a spindle motor 52 for rotating the optical recording disc 1, a head 53 for emitting a laser beam L toward the optical recording disc 1 and receiving the laser beam L reflected by the optical recording disc 1, a controller 54 for controlling the spindle motor 52 and the head 53, a laser driving circuit 55 for feeding a laser driving signal to the head 53, and a lens driving circuit 56 for feeding a lens driving signal to the head 53.

As shown in FIG. 7, the controller 54 includes a focus servo tracking circuit 57, a tracking servo circuit 58 and a laser power control circuit 59.

When the tracking servo circuit 58 is activated, the spot of the laser beam L automatically follows the track of the optical recording disc 1.

Each of the focus servo tracking circuit 57 and the tracking servo circuit 58 has an auto-gain control function for automatically adjusting the focus gain and an auto-gain control function for automatically adjusting the tracking gain.

Further, the laser power control circuit 59 is adapted to generate a laser drive signal to be supplied by the laser driving circuit 55.

In this embodiment, prior to shipping the optical recording disc 1, a recommended recording power Pw' of a recording power Pw of a laser beam L at a predetermined recording linear velocity Vw and a recommended read power Pr' of a read power Pr of a laser beam L at a predetermined readout linear velocity Vr are determined by the optical recording disc manufacturer and the recommended recording power Pw' and the recommended read power Pr' are recorded in the optical recording disc 1 together with the recording linear velocity Vw and the readout linear velocity Vr as data for setting recording and reproducing conditions in a form of wobbles or pre-pits.

When the optical recording disc 1 is set in the data recording and reproducing apparatus 50, the controller 54 first reads the data for setting recording and reproducing conditions, namely, the recommended recording power Pw', the recommended read power Pr', the recording linear velocity Vw and the readout linear velocity Vr.

Here, the recommended recording power Pw' and the recommended read power Pr' are determined based on recording characteristics and reproducing characteristics obtained by recording data in a plurality of optical recording disc samples having the same configuration at the recording linear velocity Vw while the recording power Pw of the laser beam L is varied and reproducing data recorded in the optical recording disc samples at the readout linear velocity Vr while the read power Pr of the laser beam L is varied.

Further, in the data recording and reproducing apparatus 50 according to this embodiment, program data for determining the optimum recording power Pw and optimum read power Pr of the laser beam L described later are stored in a nonvolatile memory such as a flash memory or the like. Therefore, prior to recording data in the optical recording disc 1 or reading data recorded in the optical recording disc 1, the controller 54 uses the recommended recording power Pw', the recommended read power Pr', the recording linear velocity Vw and the readout linear velocity Vr read from the optical recording disc 1 and determines the optimum recording power Pw of the laser beam L used for recording data in the optical recording disc 1 and the optimum read power Pr of the laser beam L used for reproducing data recorded in the optical recording disc 1.

Figure 8:
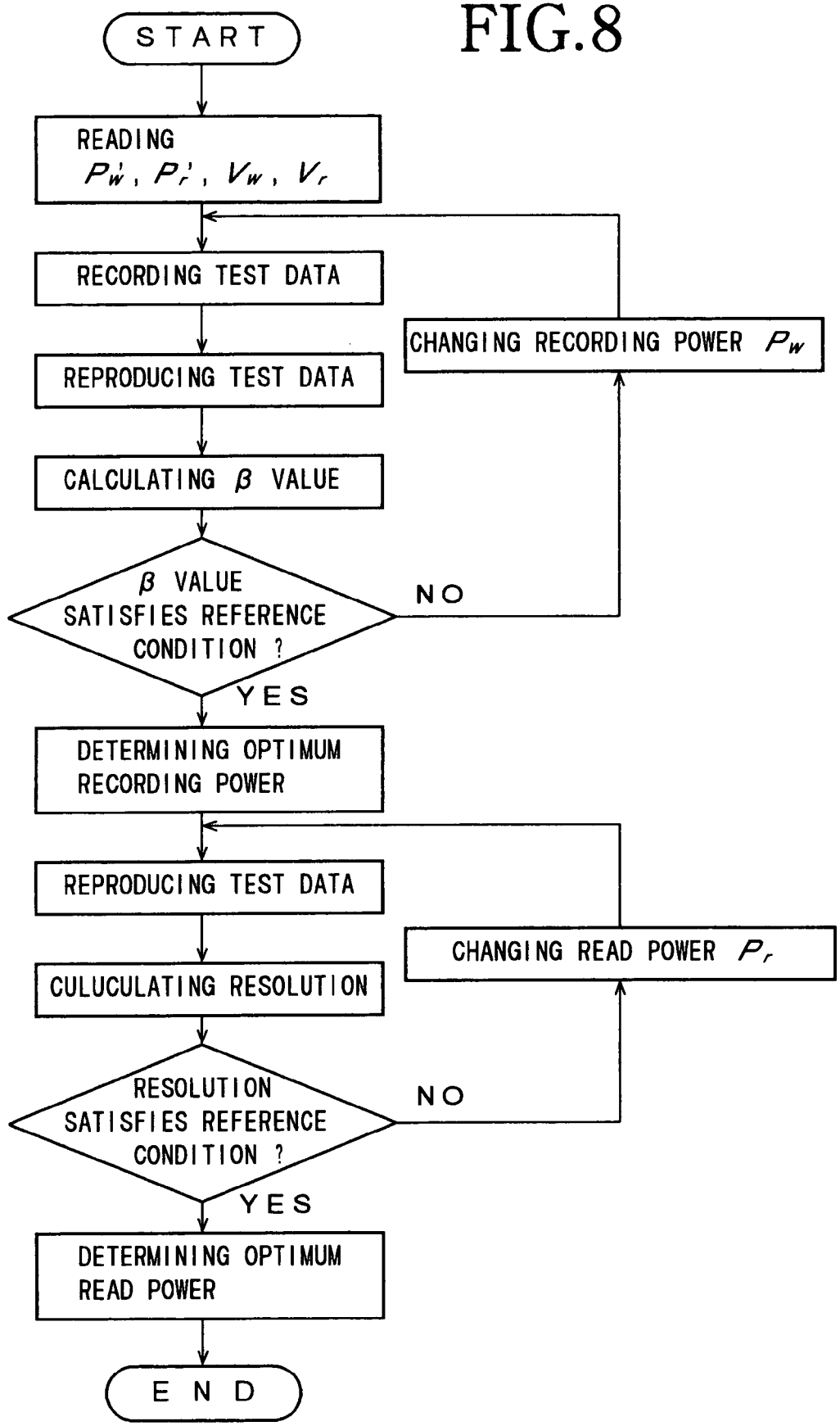
FIG. 8 is a flow chart showing a laser beam recording power and read power determination routine for determining the optimum recording power and the optimum read power of a laser beam.

FIG. 8 is a flow chart showing a laser beam recording power and read power determination routine for determining the optimum recording power and the optimum read power of a laser beam.

When the optimum recording power Pw and the optimum read power Pr of the laser beam L are to be determined, the controller 54 of the data recording and reproducing apparatus 50 first reads the recommended recording power Pw', the recommended read power Pr', the recording linear velocity Vw and the readout linear velocity Vr recorded in the optical recording disc 1.

When the recommended recording power Pw', the recommended read power Pr', the recording linear velocity Vw and the readout linear velocity Vr have been read, the controller 54 sets the recording power Pw of the laser beam L to the recommended recording power Pw' and sets the recording linear velocity at which data are to be recorded in the optical recording disc 1 to the recording linear velocity Vw.

When the recording power Pw of the laser beam L has been set to the recommended recording power Pw', the laser power control circuit 59 generates a laser power control signal so that the head 53 generates a laser beam L whose power is equal to the recommended recording power Pw' and outputs it to the laser driving circuit 55, thereby enabling the laser driving circuit 55 to generate a laser driving signal based on the laser power control signal and output it to the head 53.

Further, when a recording linear velocity at which data are to be recorded in the optical recording disc 1 has been set to the recording linear velocity Vw, the controller 54 first adjusts the position of the head 53 so that the laser beam L is irradiated onto a predetermined track in a power calibration area of the optical recording disc 1 and then adjusts the rotation speed of the optical recording disc 1 so that the recording linear velocity becomes equal to the recording linear velocity Vw.

Here, the power calibration area means an area in which test data for determining a recording power Pw and read power Pr of the laser beam and the like are to be recorded and is provided at an inner circumferential portion of the optical recording disc 1 separately from a region in which data are to be recorded by the user.

Then, the laser beam L which is emitted from the head and whose power is set to the recording power Pw' is irradiated onto the power calibration area of the optical recording disc 1 at the recording linear velocity Vw and test data are recorded in the power calibration are.

When the test data are to be recorded, a recording mark train including at least one of a recording mark having a length shorter than a resolution limit and a blank region having a length shorter than the resolution limit is formed in the decomposition reaction layer 7 in the power calibration area, thereby recording the test data therein.

When the test data have been recorded, the controller 54 sets the power of the laser beam L to the recommended read power Pr' and sets the readout linear velocity to the readout linear velocity Vr. As a result, the laser beam L whose power is set to the recommended read power Pr' is irradiated onto the optical recording disc 1 at the readout linear velocity Vr and the test data recorded in the power calibration area of the optical recording disc 1 are reproduced.

When the test data have been reproduced, the controller 54 calculates the β value from the reproduced signal obtained by reproducing the test data. Here, the β value indicates asymmetric diversity of voltage levels or energy levels obtained by converting light reflected from a recording mark and a blank region formed in the optical recording disc 1 to voltages or energy and has correlation with the length and width of the recording mark. Therefore, the β value is determined depending upon the level of the recording power Pw of the laser beam L used for recording data in the optical recording disc 1.

In the case where the optical recording disc 1 is a High to Low type optical recording disc 1, the B value is defined as (A1+A2)/(A1−A2) where A1 is a local maximal value on the plus side of an alternating signal obtained by reproducing the test signal and A2 is a local minimal value on the minus side of the alternating signal.

Then, the controller judges whether or not the thus calculated β value satisfies reference conditions.

Whether the β value satisfies reference conditions is determined by judging whether or not the thus calculated β value falls within a reference range determined by the standard of the optical recording disc 1.

When the controller 54 judges that the β value does not satisfy the reference conditions, since it can be considered that the level of the recording power Pw of the laser beam L set for recording the test data is inappropriate, the controller 54 outputs a control signal to the laser power control circuit 59 to increase the recording power Pw of the laser beam L.

Then, the laser beam L whose power is set to a different recording power Pw is irradiated onto the power calibration area of the optical recording disc 1, whereby test data are again recorded therein and the thus recorded test data are reproduced. It is then judged whether or not a β value calculated from the reproduced signal satisfies reference conditions. At this time, when the β value does not fall within the reference range and is located on the minus side with respect to the reference range, the controller 54 judges that the recording power Pw of the laser beam L is higher than the optimum recording power and it was inappropriate to increase the recording power Pw of the laser beam L and lowers the recording power Pw of the laser beam L. To the contrary, when the β value does not fall within the reference range and is located on the plus side with respect to the reference range, the controller 54 judges that the recording power Pw of the laser beam L once changed is still lower than the optimum recording power and further increases the recording power Pw of the laser beam L.

On the other hand, when the β value satisfies reference conditions, the controller 54 judges that the recording power Pw of the laser beam L set for recording the test data is appropriate and determines the recording power Pw of the laser beam L used for recording the test data as the optimum recording power Pw to be used when data are to be recorded by the user in the optical recording disc 1.

When the optimum recording power Pw has been determined, the controller 54 sets the power of the laser beam L to the recommended read power Pr' and reproduces data recorded by irradiating the laser beam L whose power is set to the optimum recording power Pw onto the optical recording disc 1.

When the reproduction of the test data has been completed, the controller 54 calculates resolution from a reproduced signal obtained by reproducing the test signal. In this embodiment, the resolution is defined as the ratio Imin/Imax where Imin=(A1min−A2min) is an amplitude of a reproduced signal corresponding to the smallest recording mark among the recording marks formed in the decomposition reaction layer 7 and Imax is an amplitude of a reproduced signal corresponding to the largest recording mark.

Then, the controller 54 judges whether or not the thus calculated resolution satisfies reference conditions. Whether or not the thus calculated resolution satisfies reference conditions is determined by judging whether or not the resolution is larger than a reference value determined by the standard of the optical recording disc 1 or whether or not the thus calculated resolution falls within a reference range determined by the standard of the optical recording disc 1. Here, the amplitude Imin of a direct current corresponding to the smallest recording mark among direct currents obtained by reproducing the test signal is determined depending upon the level of the read power Pr of the laser beam L used for reproducing data recorded in the optical recording disc 1 and, therefore, the resolution of a reproduced signal is determined depending upon the level of the read power Pr of the laser beam L. In view of these facts, in this embodiment, whether or not the read power Pr of the laser beam L is optimum is judged by referring to the resolution of a reproduced signal.

When the controller 54 judges that the resolution does not satisfy the reference conditions, the controller 54 judges that the level of the read power Pr of the laser beam L set for reproducing the test signal was inappropriate and outputs a control signal to the laser power control circuit 59 to increase the level of the read power Pr of the laser beam L.

The laser beam L whose power is set to a different read power Pr is again irradiated onto the power calibration area of the optical recording disc 1 in which the test data are recorded, thereby reproducing the test signal and it is judged whether or not the resolution calculated from a reproduced signal satisfies the reference conditions. At this time, in the case where the resolution of the test signal obtained by reproducing the test data using the laser beam L whose read power Pr is increased becomes lower than the resolution of the reproduced signal obtained by reproducing the test data before the read power Pr of the laser beam L was increased, the controller 54 judges that it was inappropriate to increase the read power Pr of the laser beam L and lowers the read power Pr of the laser beam L.

On the other hand, when the controller 54 judges that the resolution satisfies the reference conditions, the controller 54 judges that the read power Pr of the laser beam L set for reproducing the test data is appropriate and determines the read power Pr of the laser beam L as the optimum read power Pr of the laser beam L to be used when data are to be reproduced by the user from the optical recording disc 1.

When the optimum recording power Pw of the laser beam L to be used for recording data in the optical recording disc 1 and the optimum read power Pr of the laser beam L to be used for reproducing data recorded in the optical recording disc 1 have been determined in this manner, the laser beam L is irradiated onto the optical recording disc 1 from the side of the light transmission layer 9, whereby data are recorded in the optical recording disc 1 and data recorded in the optical recording disc 1 are reproduced.

Figure 9:
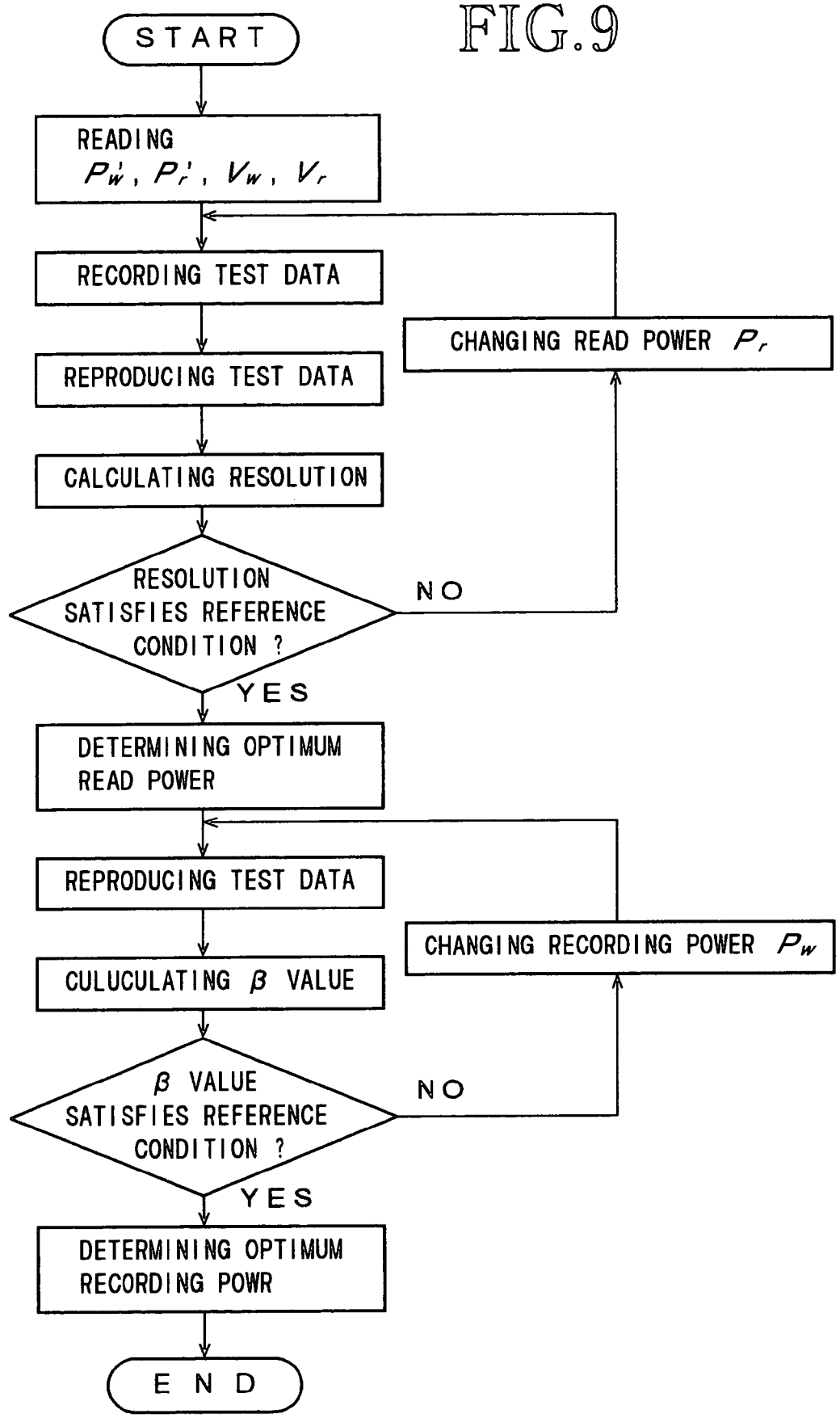
FIG. 9 is a flow chart showing another laser beam recording power and read power determination routine for determining the optimum recording power and the optimum read power of a laser beam.

FIG. 9 is a flow chart showing another laser beam recording power and read power determination routine for determining the optimum recording power and the optimum read power of a laser beam.

While the optimum read power Pr is determined after the optimum recording power Pw was determined in the routine for determining the optimum read power Pr and the optimum recording power Pw shown in FIG. 8, in this embodiment, the optimum recording power Pw of the laser beam L is determined after the optimum read power Pr has been determined.

When the optimum recording power Pw and the optimum read power Pr of the laser beam L are to be determined, the controller 54 of the data recording and reproducing apparatus 50 first reads the recommended recording power Pw', the recommended read power Pr', the recording linear velocity Vw and the readout linear velocity Vr recorded in the optical recording disc 1 and sets the recording power Pw of the laser beam L to the recommended recording power Pw'and the recording linear velocity at which data are to be recorded in the optical recording disc 1 to the recording linear velocity Vw.

Then, the controller 54 irradiats the laser beam L whose power is set to the recommended recording power Pw' from the head 53 onto the power calibration area of the optical recording disc 1 at the recording linear velocity Vw and records test data in the power calibration area of the optical recording disc 1.

When the test data are to be recorded, a recording mark train including at least one of a recording mark having a length shorter than a resolution limit and a blank region having a length shorter than the resolution limit is formed in the decomposition reaction layer 7 in the power calibration area, thereby recording the test data therein.

When the test data have been recorded, the controller 54 sets the power of the laser beam L to the recommended read power Pr' and sets the readout linear velocity to the readout linear velocity Vr. As a result, the laser beam L whose power is set to the recommended read power Pr' is irradiated onto the optical recording disc 1 at the readout linear velocity Vr and the test data recorded in the power calibration area of the optical recording disc 1 are reproduced.

When the test data have been reproduced, the controller 54 calculates the resolution from the reproduced signal obtained by reproducing the test data.

Then, the controller 54 judges whether or not the thus calculated resolution satisfies reference conditions.

When the controller 54 judges that the B value does not satisfy the reference conditions, since it can be considered that the level of the read power Pr of the laser beam L set for reproducing the test data was inappropriate, the controller 54 outputs a control signal to the laser power control circuit 59 and changes the read power Pr of the laser beam L.

On the other hand, when the controller 54 judges that the $\beta$ value satisfies the reference conditions, the controller 54 judges that the level of the read power Pr of the laser beam L set for reproducing the test data is appropriate and determines the read power Pr of the laser beam L as the optimum read power Pr of the laser beam L to be used when data recorded in the optical recording disc 1 are to be reproduced by the user. Thus, the optimum read power Pr of the laser beam L to be used when data recorded in the optical recording disc 1 are to be reproduced by the user is determined.

When the optimum read power Pr of the laser beam L has been determined, the controller 54 sets the power of the laser beam L to the optimum read power Pr and again reproduces the test data recorded by irradiating the laser beam L whose power is set to the optimum read power Pr onto the optical recording disc 1.

When the reproduction of the test data has been completed, the controller 54 calculates the B value from the reproduced signal obtained by reproducing the test signal.

When the controller 54 judges that the $\beta$ value does not satisfy the reference conditions, the controller 54 judges that the level of the recording power Pw of the laser beam L set for recording the test data was inappropriate and outputs a control signal to the laser power control circuit 59 to change the level of the recording power Pw of the laser beam L.

On the other hand, when the controller 54 judges that the $\beta$ value satisfies the reference conditions, the controller 54 judges that the level of the recording power Pw of the laser beam L set for recording the test data is appropriate and determines the recording power Pw of the laser beam L as the optimum recording power Pw to be used when data are to be recorded by the user in the optical recording disc 1. Thus, the optimum recording power Pw of the laser beam L to be used for recording data in the optical recording disc 1 by the user is determined.

As described above, according to this embodiment, the optimum read power Pr of the laser beam L is determined by setting the power of the laser beam L to the recommended recording power Pw', irradiating the laser beam L whose power is set to the recommended recording power Pw' onto the optical recording disc 1, forming a recording mark train including at least one of a recording mark having a length shorter than a resolution limit and a blank region having a length shorter than the resolution limit in the optical recording disc 1, thereby recording test data therein, setting the power of the laser beam L to the recommended read power Pr', irradiating the laser beam L whose power is set to the recommended read power Pr' onto the optical recording disc 1, thereby reproducing the test data recorded in the optical recording disc 1, judging whether or not the resolution of a reproduced signal obtained by reproducing the test data satisfies the reference conditions, changing the power of the laser beam L for reproducing the test data based on the result of the judgment, and determining the power of the laser beam L as the optimum read power Pr of the laser beam L when the resolution of the reproduced signal obtained by reproducing the test data satisfies the reference conditions, so that it is possible to control the read power Pr of the laser beam L in a desired manner to a level suitable for reproducing data recorded in the optical recording disc 1 prior to actually reproducing data recorded in the optical recording disc 1. Therefore, it is possible to reproduce data recorded in the optical recording disc 1 by forming a recording mark having a length shorter than the resolution limit and a blank region having a length shorter than the resolution limit in the optical recording disc 1 in a desired manner.

Further, according to this embodiment, the optimum recording power Pw of the laser beam L is determined by setting the power of the laser beam L to the recommended recording power Pw', irradiating the laser beam L whose power is set to the recommended recording power Pw' onto the optical recording disc 1, forming a recording mark train including at least one of a recording mark having a length shorter than a resolution limit and a blank region having a length shorter than the resolution limit in the optical recording disc 1, thereby recording test data therein, setting the power of the laser beam L to the recommended read power Pr', irradiating the laser beam L whose power is set to the recommended read power Pr' onto the optical recording disc 1, thereby reproducing the test data recorded in the optical recording disc 1, judging whether or not the $\beta$ value of a reproduced signal obtained by reproducing the test data satisfies the reference conditions, changing the power of the laser beam L for recording the test data based on the result of the judgment, and determining the power of the laser beam L as the optimum recording power of the laser beam L when the $\beta$ value of the reproduced signal obtained by reproducing the test data satisfies the reference conditions, so that it is possible to control the recording power Pw of the laser beam L in a desired manner so as to be a level suitable for recording data in the optical recording disc 1 prior to recording data in the optical recording disc 1. Therefore, it is possible to record data in the optical recording disc 1 in a desired manner.

WORKING EXAMPLES

Hereinafter, working examples will be set out in order to further clarify the advantages of the present invention.

Working Example 1

An optical recording disc sample #1 was fabricated in the following manner.

A polycarbonate substrate having a thickness of 1.1 mm and a diameter of 120 mm was first set in a sputtering apparatus and a reflective layer having a thickness of 20 nm was formed on the surface of the polycarbonate substrate by a sputtering process using Pt as a target.

A third dielectric layer having a thickness of 100 nm was then formed on the surface of the reflective layer by a sputtering process using a target of a mixture of ZnS and $SiO_2$. The mole ratio of ZnS to $SiO_2$ in the mixture of ZnS and $SiO_2$ contained in the third dielectric layer was 80:20.

Further, a light absorption layer having a thickness of 60 nm was formed on the surface of the third dielectric layer by a sputtering process using $Ag_{6.0}In_{5.5}Sb_{60.8}Te_{28.7}$ as a target. The composition of the light absorption layer was $Ag_{6.0}In_{5.5}Sb_{60.8}Te_{28.7}$ I terms of an atomic ratio and the same as that of the target.

Furthermore, a second dielectric layer having a thickness of 60 nm was then formed on the surface of the light absorption layer by a sputtering process using a target of a mixture of ZnS and $SiO_2$. The mole ratio of ZnS to $SiO_2$ in the mixture of ZnS and $SiO_2$ contained in the second dielectric layer was 80:20.

Then, a decomposition reaction layer containing platinum oxide as a primary component and having a thickness of 4 nm was formed on the surface of the second dielectric layer by a sputtering process using a mixed gas of Ar gas and oxygen gas as a sputtering gas and a Pt target.

Further, a first dielectric layer having a thickness of 70 nm was then formed on the surface of the decomposition reaction layer by a sputtering process using a target of a mixture of ZnS and $SiO_2$. The mole ratio of ZnS to $SiO_2$ in the mixture of ZnS and $SiO_2$ contained in the first dielectric layer was 80:20.

Finally, a resin solution prepared by dissolving an acrylic ultraviolet ray curable resin in a solvent was applied onto the surface of the first dielectric layer using a spin coating method to form a coating layer and an ultraviolet ray was irradiated onto the coating layer to cure the acrylic ultraviolet ray curable resin, thereby forming a light transmission layer having a thickness of 100 μm.

Thus, the optical recording disc sample #1 was fabricated.

Then, the optical recording disc sample #1 was set in an optical recording medium evaluation apparatus for emitting a laser beam having a wavelength of 405 nm and the laser beam was irradiated using an objective lens having an NA (numerical aperture) of 0.85 onto the optical recording disc sample #1 from the side of the light transmission layer, thereby forming a recording mark in the decomposition reaction layer of the optical recording disc sample #1 so that the length of the recording mark was 75 nm shorter than the resolution limit of 120 nm under the following conditions.

Recording linear velocity: 6.0 m/sec
Recording power: 8.0 mW
Recording regions: on-groove recording After forming the recording mark, data recorded in the optical recording disc sample #1 were reproduced using the same optical recording medium evaluation apparatus at a readout linear velocity of 3 m/sec and a C/N ratio of a reproduced signal was measured. Here, a read power of the laser beam was set to 1.2 mW. The results of the measurement are shown in FIG. 10.

Then, data recorded in the optical recording disc sample #1 were reproduced while varying the read power Pr of the laser beam from 1.2 mW by about 0.2 mW and a C/N ratio of a reproduced signal was measured.

Figure 10:
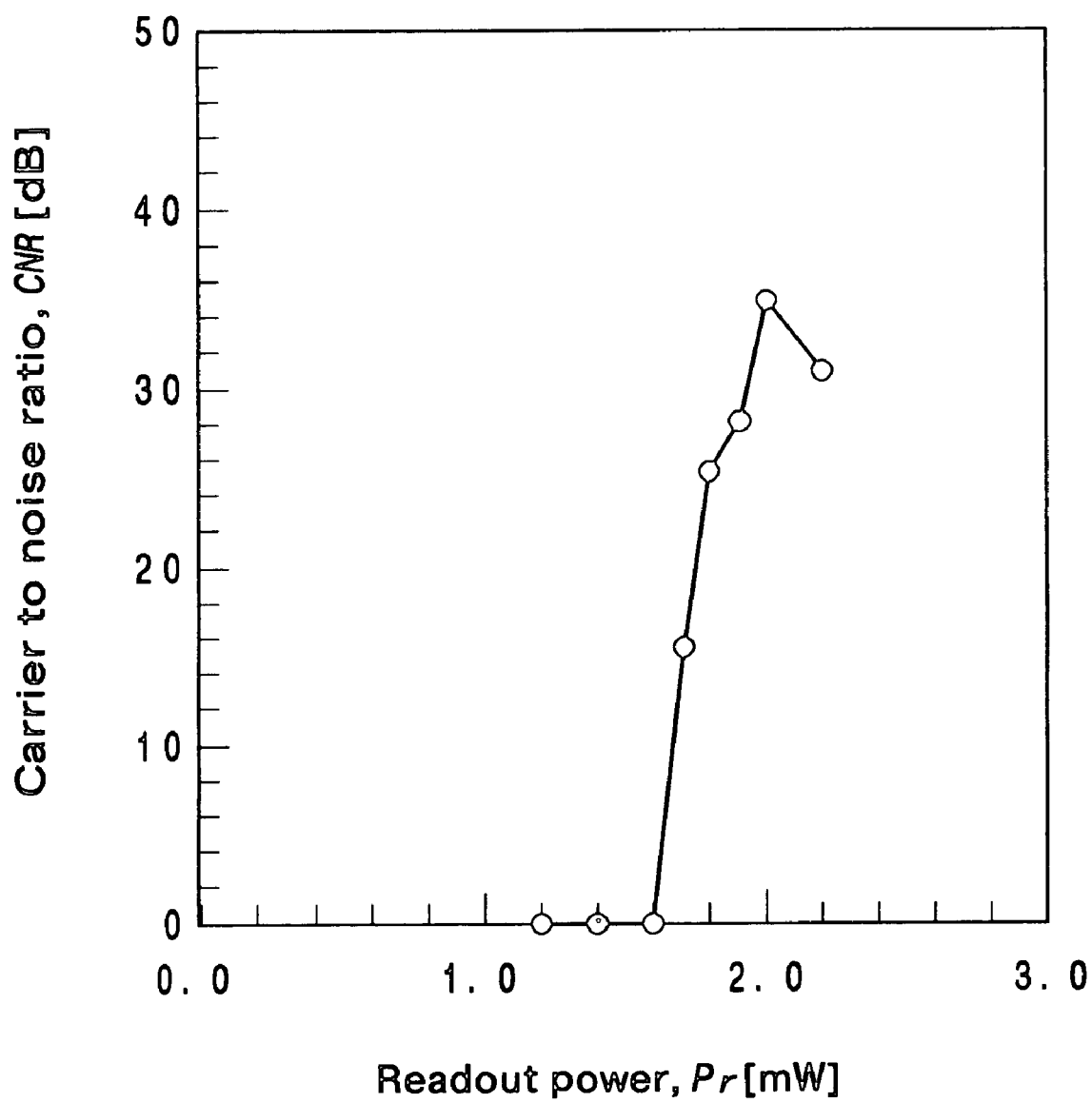
FIG. 10 is a graph showing the relationship between the C/N ratio of a reproduced signal obtained by reproducing data recorded in an optical recording disc sample # 1 and the read power of the laser beam.

The results of the measurement are shown in FIG. 10.

As apparent from FIG. 10, it was found that in the case where data recorded in the optical recording disc sample #1 were reproduced by irradiating the laser beam having a read power equal to or lower than about 1.6 mW thereonto, the C/N ratio of the reproduced signal was 0 dB and data recorded in the optical recording disc sample #1 could not be reproduced. On the other hand, it was found that when the read power of the laser beam irradiated onto the optical recording disc sample #1 exceeded about 1.6 mW, the C/N ratio of the reproduced signal began to increase and when the read power of the laser beam irradiated onto the optical recording disc sample #1 became equal to about 1.8 mW, the C/N ratio of a reproduced signal reached a local maximal value. It was furthermore found that when the read power of the laser beam irradiated onto the optical recording disc sample #1 exceeded about 1.8 mW, a C/N ratio of a reproduced signal became lower as the read power of the laser beam increased.

Working Example 2

An optical recording disc sample #2 was fabricated in the following manner.

A light transmissible substrate having a thickness of 0.6 mm and a diameter of 120 mm was first set in a sputtering apparatus and a first dielectric layer having a thickness of 130 nm was formed on the surface of the light transmissible substrate by a sputtering process using a target of a mixture of ZnS and $SiO_2$. The mole ratio of ZnS to $SiO_2$ in the mixture of ZnS and $SiO_2$ contained in the first dielectric layer was 85:15.

Then, a decomposition reaction layer containing platinum oxide as a primary component and having a thickness of 4 nm was formed on the surface of the first dielectric layer by sputtering a target containing platinum as a primary component in atmosphere of a mixed gas of Ar and oxygen by a sputtering process using a mixed gas of Ar gas and oxygen gas as a sputtering gas and a Pt target.

Then, a second dielectric layer having a thickness of 40 nm was then formed on the surface of the decomposition reaction layer by a sputtering process using a target of a mixture of ZnS and $SiO_2$. The mole ratio of ZnS to $SiO_2$ in the mixture of ZnS and $SiO_2$ contained in the second dielectric layer was 85:15.

Further, a light absorption layer having a thickness of 60 nm was formed on the surface of the second dielectric layer by a sputtering process using $Ag_{6.0}In_{5.5}Sb_{60.8}Te_{28.7}$ as a target. The composition of the light absorption layer was $Ag_{6.0}In_{5.5}Sb_{60.8}Te_{28.7}$ I terms of an atomic ratio and the same as that of the target.

Furthermore, a third dielectric layer having a thickness of 100 nm was then formed on the surface of the light absorption layer by a sputtering process using a target of a mixture of ZnS and $SiO_2$. The mole ratio of ZnS to $SiO_2$ in the mixture of ZnS and $SiO_2$ contained in the third dielectric layer was 85:15.

Thus, the optical recording disc sample #2 was fabricated.

Then, the optical recording disc sample #2 was set in an optical recording medium evaluation apparatus for emitting a laser beam having a wavelength of 635 nm and the laser beam was irradiated using an objective lens having an NA (numerical aperture) of 0.60 onto the optical recording disc sample #2 from the side of the light transmission layer, thereby forming a recording mark in the decomposition reaction layer of the optical recording disc sample #2 so that the length of the recording mark was 200 nm shorter than the resolution limit of 265 nm under the following conditions.

Recording linear velocity: 6.0 m/sec
Recording power: 10.0 mW
Recording regions: on-groove recording After forming the recording mark, data recorded in the optical recording disc sample #2 were reproduced using the same optical recording medium evaluation apparatus at a readout linear velocity of 1 m/sec and a C/N ratio of a reproduced signal was measured. Here, a read power of the laser beam was set to 0.8 mW. The results of the measurement are shown in FIG. 11.

Then, data recorded in the optical recording disc sample #2 were reproduced while varying the read power Pr of the laser beam from 0.8 mW by about 0.2 mW and a C/N ratio of a reproduced signal was measured.

Figure 11:
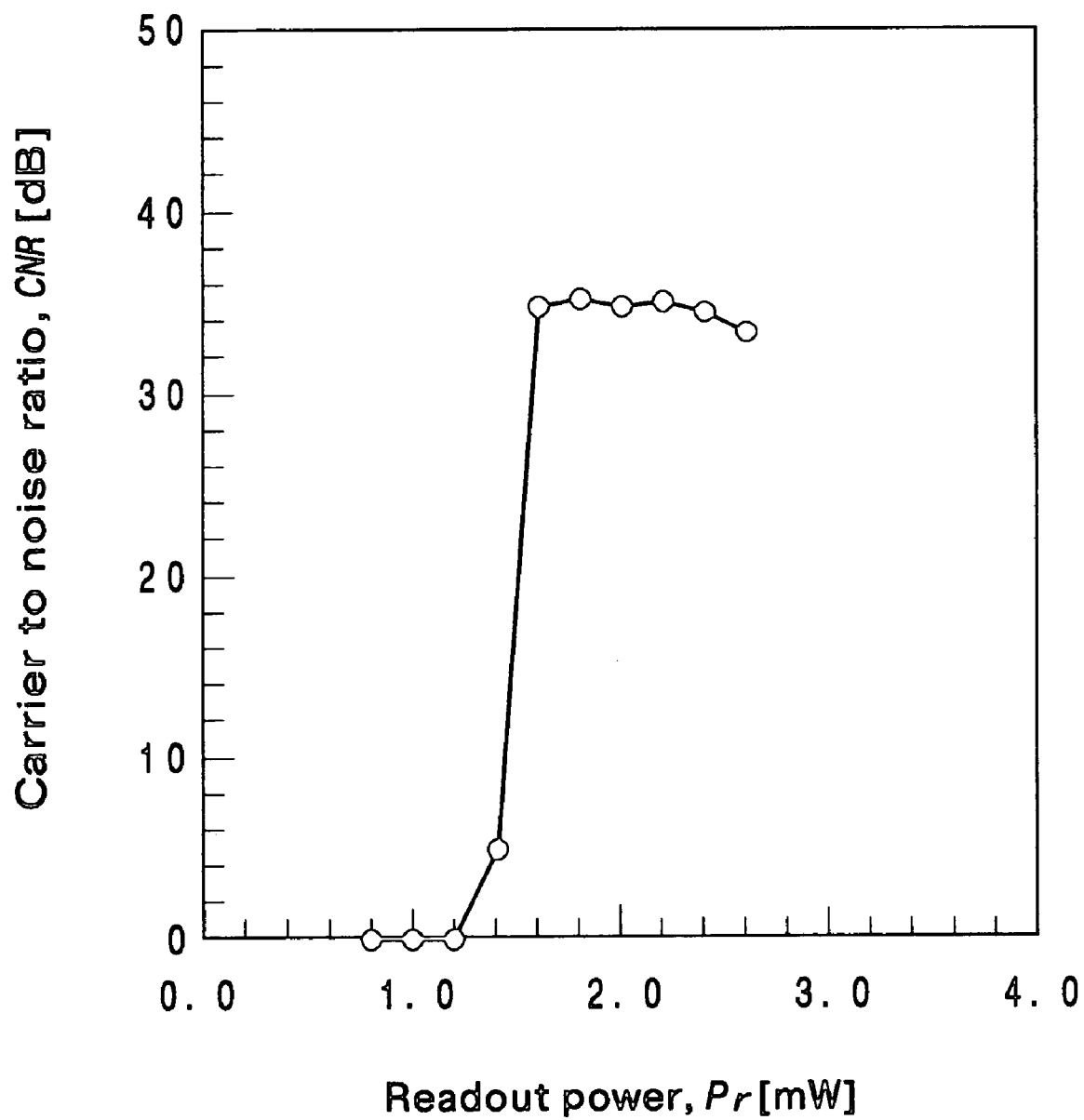
FIG. 11 is a graph showing the relationship between the C/N ratio of a reproduced signal obtained by reproducing data recorded in an optical recording disc sample # 2 and the read power of the laser beam.

The results of the measurement are shown in FIG. 11.

As apparent from FIG. 11, it was found that in the case where data recorded in the optical recording disc sample #2 were reproduced by irradiating the laser beam having a read power equal to or lower than about 1.2 mW thereonto, the C/N ratio of the reproduced signal was 0 dB and data recorded in the optical recording disc sample #2 could not be reproduced. On the other hand, it was found that when the read power of the laser beam irradiated onto the optical recording disc sample #2 exceeded about 1.2 mW, the C/N ratio of the reproduced signal began to increase and when the read power of the laser beam irradiated onto the optical recording disc sample #2 became equal to about 1.6 mW, the C/N ratio of the reproduced signal reached a local maximal value. It was furthermore found that when the read power of the laser beam irradiated onto the optical recording disc sample #2 exceeded about 1.6 mW, the C/N ratio of a reproduced signal gradually became lower as the read power of the laser beam increased.

The present invention has thus been shown and described with reference to a specific embodiment and working examples. However, it should be noted that the present invention is in no way limited to the details of the described arrangements but changes and modifications may be made without departing from the scope of the appended claims.

For example, in the above described preferred embodiments, although whether or not the signal characteristics of a reproduced signal satisfy reference conditions is judged by calculating the resolution from a reproduced signal obtained by reproducing the test signal and judging whether or not the resolution satisfies reference conditions, it is not absolutely necessary to judge whether or not the signal characteristics of a reproduced signal satisfy reference conditions using the resolution of a reproduced signal and it is possible to judge whether or not the signal characteristics of a reproduced signal satisfy reference conditions using parameters other than the resolution obtained from a reproduced signal obtained by reproducing the test signal.

Further, in the above described preferred embodiments, although the optical recording disc 1 is constituted by laminating the decomposition reaction layer 7, the second dielectric layer 6 and the light absorption layer 5 from the light incidence plane of the laser beam L in this order, application of the present invention is not limited to only the case of determining the read power of a laser beam L to be irradiated onto the optical recording disc 1 having such configuration for reproducing data recorded therein. The optical recording disc may be constituted by laminating the decomposition reaction layer 7, the second dielectric layer 6 and the light absorption layer 5 from the opposite side of the light incidence plane of the laser beam L in this order or laminating a light absorption layer, a dielectric layer, a decomposition reaction layer, a dielectric layer and a light absorption layer from the light incidence plane of the laser beam L in this order, for example. In other words, in the present invention, it is sufficient for the optical recording disc to include a multi-layered body formed by at least a decomposition reaction layer and a light absorption layer so as to sandwich a dielectric layer.

Furthermore, although in the above described preferred embodiments, the optical recording disc 1 includes the reflective layer 3 formed on surface of the support substrate 2, it is not absolutely necessary to provide the reflective layer 3 and the reflective layer 3 may be omitted. In such a case, the third dielectric layer 4 serves to protect not only the support substrate 2 but also the light absorption layer 5 formed on the third dielectric layer 4.

Moreover, although in the above described preferred embodiments, the recommended recording power Pw', the recommended read power Pr', the recording linear velocity Vw and the readout linear velocity Vr are recorded in advance in the form of wobbles or pre-pits in the optical recording disc 1 as data for setting recording and reproducing conditions, it is not absolutely necessary to record in advance the recommended recording power Pw', the recommended read power Pr', the recording linear velocity Vw and the readout linear velocity Vr in the form of wobbles or pre-pits in the optical recording disc 1 as data for setting recording and reproducing conditions and it is possible to record ID data for identifying the kind of an optical recording disc in the optical recording disc 1 in a form of wobbles or pre-pits and store the recommended recording power Pw', the recommended read power Pr', the recording linear velocity Vw and the readout linear velocity Vr in the data recording and reproducing apparatus 50 in association with the ID data.

According to the present invention, it is possible to provide a method for determining a read power of a laser beam applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

Further, according to the present invention, it is possible to provide an apparatus for recording and reproducing data applicable to an optical recording disc which can record data therein and reproduce data therefrom even in the case where the lengths of a recording mark and a blank region between neighboring recording marks which constitute the data are shorter than the resolution limit and whose storage capacity can be markedly increased.

The invention claimed is:

1. A method for determining a read power of a laser beam to be irradiated onto an optical recording disc comprising a multi-layered body formed by forming a decomposition reaction layer containing noble metal oxide as a primary component and a light absorption layer so as to sandwich at least a dielectric layer therebetween and reproduce data recorded in the optical recording disc by forming a recording mark train including at least one of a recording mark having a length shorter than a resolution limit and a blank region having a length shorter than the resolution limit therein, which method for determining a read power of a laser beam comprises a first step of setting a power of the laser beam to a recommended recording power determined in advance, irradiating the laser beam whose power is set to the recommended recording power onto the optical recording disc and forming a recording mark train including at least one of a recording mark having a length shorter than a resolution limit and a blank region having a length shorter than the resolution limit, thereby recording test data therein, a second step of setting a power of the laser beam to a recommended read power determined in advance, irradiating the laser beam whose power is set to the recommended read power onto the optical recording disc and reproducing the test data recorded in the optical recording disc, a third step of judging whether or not signal characteristics of a reproduced signal obtained by reproducing the test data satisfies reference conditions, and a fourth step of changing the power of the laser beam for reproducing the test data when the signal characteristics of the reproduced signal do not satisfy the reference conditions and determining the power of the laser beam as an optimum read power when the signal characteristics of the reproduced signal satisfy the reference conditions.

2. A method for determining a read power of a laser beam in accordance with claim 1, wherein the third step is constituted by judging whether or not resolution of the reproduced signal obtained by reproducing the test data satisfies the reference conditions.

3. A method for determining a read power of a laser beam in accordance with claim 1, which further comprises between the first step and the second step a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, and the second step is constituted by irradiating the laser beam whose power is set to the recommended read power onto the optical recording disc and reproducing test data recorded using a laser beam having the optimum recording power determined at the seventh step.

4. A method for determining a read power of a laser beam in accordance with claim 2, which further comprises between the first step and the second step a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, and the second step is constituted by irradiating the laser beam whose power is set to the recommended read power onto the optical recording disc and reproducing test data recorded using a laser beam having the optimum recording power determined at the seventh step.

5. A method for determining a read power of a laser beam in accordance with claim 1, which further comprises after the fourth step a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions.

6. A method for determining a read power of a laser beam in accordance with claim 2, which further comprises after the fourth step a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions.

7. A method for determining a read power of a laser beam in accordance with claim 3, wherein the sixth step is constituted by judging whether or not a $\beta$ value obtained by reproducing the test data satisfies the reference conditions.

8. A method for determining a read power of a laser beam in accordance with claim 4, wherein the sixth step is constituted by judging whether or not a $\beta$ value obtained by reproducing the test data satisfies the reference conditions.

9. An apparatus for recording and reproducing data adapted for irradiating a laser beam onto an optical recording disc comprising a multi-layered body formed by forming a decomposition reaction layer containing noble metal oxide as a primary component and a light absorption layer so as to sandwich at least a dielectric layer therebetween, forming a recording mark train including at least one of a recording mark having a length shorter than a resolution limit and a blank region having a length shorter than the resolution limit therein, thereby recording data therein and reproducing the thus recorded data, the apparatus for recording and reproducing data comprising an irradiating means for irradiating the laser beam onto the optical recording disc and a control means for controlling a power of the laser beam, the control means being constituted so as to perform a first step of setting a power of the laser beam to a recommended recording power determined in advance, irradiating the laser beam whose power is set to the recommended recording power onto the optical recording disc and forming a recording mark train including at least one of a recording mark having a length shorter than a resolution limit and a blank region having a length shorter than the resolution limit, thereby recording test data therein, a second step of setting a power of the laser beam to a recommended read power determined in advance, irradiating the laser beam whose power is set to the recommended read power onto the optical recording disc and reproducing the test data recorded in the optical recording disc, a third step of judging whether or not signal characteristics of a reproduced signal obtained by reproducing the test data satisfy reference conditions, and a fourth step of changing the power of the laser beam for reproducing the test data when the signal characteristics of the reproduced signal do not satisfy the reference conditions and determining the power of the laser beam as an optimum read power when the signal characteristics of the reproduced signal satisfy the reference conditions, set the power of the laser beam to the optimum read power determined at the fourth step and reproduce data recorded in the optical recording disc.

10. An apparatus for recording and reproducing data in accordance with claim 9, wherein the control means is constituted so as to judge whether or not resolution of the reproduced signal obtained by reproducing the test data satisfies the reference conditions at the third step.

11. An apparatus for recording and reproducing data in accordance with claim 9, wherein the control means is constituted so as to perform, between the first step and the second step, a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

12. An apparatus for recording and reproducing data in accordance with claim 10, wherein the control means is constituted so as to perform, between the first step and the second step, a fifth step of setting a power of the laser beam to the recommended read power, irradiating the laser beam whose power is set to the recommended read power onto the optical recording disc and reproducing the test data recorded in the optical recording disc, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

13. An apparatus for recording and reproducing data in accordance with claim 9, wherein the control means is constituted so as to perform, after the fourth step, a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

14. An apparatus for recording and reproducing data in accordance with claim 10, wherein the control means is constituted so as to perform, after the fourth step, a fifth step of irradiating the laser beam having the optimum power determined at the fourth step onto the optical recording disc and reproducing test data recorded therein, a sixth step of judging whether or not signal characteristics of a reproduced signal obtained by reproducing the test data satisfy reference conditions, and a seventh step of changing the power of the laser beam for recording the test data when the signal characteristics of the reproduced signal do not satisfy the reference conditions and determining the power of the laser beam as an optimum recording power when the signal characteristics of the reproduced signal satisfy the reference conditions, set the power of the laser beam to the optimum recording power determined at the seventh step and record data in the optical recording disc.

15. An apparatus for recording and reproducing data in accordance with claim 13, wherein the control means is constituted so as to judge whether or not a $\beta$ value obtained by reproducing the test data satisfies the reference conditions at the sixth step.

16. An apparatus for recording and reproducing data in accordance with claim 14, wherein the control means is constituted so as to judge whether or not a $\beta$ value obtained by reproducing the test data satisfies the reference conditions at the sixth step.

* * * * *

UNITED STATES PATENT AND TRADEMARK OFFICE
CERTIFICATE OF CORRECTION

| | |
|---|---|
| PATENT NO. | : 7,440,370 B2 |
| APPLICATION NO. | : 10/929894 |
| DATED | : October 21, 2008 |
| INVENTOR(S) | : Masashi Kuwahara et al. |

It is certified that error appears in the above-identified patent and that said Letters Patent is hereby corrected as shown below:

On the Title page Item (73)

"TDK Corporation, Tokyo (JP)" should read as --National Institute of Advanced Industrial Science and Technology, Tokyo (JP) and TDK Corporation, Tokyo (JP)--.

Signed and Sealed this
Twenty-sixth Day of April, 2011

David J. Kappos
*Director of the United States Patent and Trademark Office*